(12) United States Patent
Takada et al.

(10) Patent No.: US 6,706,105 B2
(45) Date of Patent: Mar. 16, 2004

(54) AQUEOUS INK, INK-JET RECORDING METHOD, RECORDING UNIT, INK CARTRIDGE, INK SET, AND INK-JET RECORDING APPARATUS

(75) Inventors: Yuko Takada, Kanagawa (JP); Mikio Sanada, Kanagawa (JP); Tomonari Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 09/961,928

(22) Filed: Sep. 25, 2001

(65) Prior Publication Data

US 2002/0059883 A1 May 23, 2002

(30) Foreign Application Priority Data

Sep. 29, 2000 (JP) .......................... 2000-300290

(51) Int. Cl.$^7$ .............................................. C09D 11/02
(52) U.S. Cl. ................ 106/31.6; 106/31.75; 106/31.86
(58) Field of Search ........................... 106/31.6, 31.75, 106/31.86

(56) References Cited

U.S. PATENT DOCUMENTS

| | | | |
|---|---|---|---|
| 4,313,124 A | 1/1982 | Hara .................... 346/140 R |
| 4,345,262 A | 8/1982 | Shirato et al. .......... 346/140 R |
| 4,459,600 A | 7/1984 | Sato et al. ............. 346/140 R |
| 4,463,359 A | 7/1984 | Ayata et al. ................ 346/1.1 |
| 4,558,333 A | 12/1985 | Sugitani et al. ........ 346/140 R |
| 4,723,129 A | 2/1988 | Endo et al. .................. 346/1.1 |
| 4,740,796 A | 4/1988 | Endo et al. .................. 346/1.1 |
| 5,184,148 A | 2/1993 | Suga et al. .................. 346/1.1 |
| 5,609,671 A | 3/1997 | Nagasawa ................. 106/20 R |
| 5,985,015 A | 11/1999 | Kanaya |
| 6,153,001 A | 11/2000 | Suzuki et al. ............. 106/31.65 |
| 6,155,673 A | 12/2000 | Nakajima et al. ............. 347/61 |
| 6,221,141 B1 | 4/2001 | Takada et al. ............. 106/31.6 |
| 6,280,513 B1 | 8/2001 | Osumi et al. ............. 106/31.6 |
| 6,332,919 B2 * | 12/2001 | Osumi et al. ............. 106/31.6 |
| 6,425,662 B1 * | 7/2002 | Teraoka et al. .............. 347/100 |
| 6,435,677 B1 * | 8/2002 | Koitabashi et al. ........... 347/96 |
| 6,460,989 B1 * | 10/2002 | Yano et al. .................. 347/101 |
| 6,506,245 B1 * | 1/2003 | Kinney et al. ............... 106/493 |
| 2001/0033318 A1 * | 10/2001 | Koitabashi et al. ......... 347/101 |
| 2002/0012035 A1 * | 1/2002 | Mouri et al. ................ 347/100 |
| 2002/0197467 A1 * | 12/2002 | Johnson ..................... 428/333 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |
| JP | 3-210373 | 9/1991 |
| JP | 2783647 B2 | 1/1992 |
| JP | 5-186704 | 7/1993 |
| JP | 8-3498 | 1/1996 |
| JP | 10-183046 | 7/1998 |
| JP | 11-228898 | 8/1999 |
| JP | 2000-108495 | 4/2000 |
| JP | 2000-204305 | 7/2000 |
| WO | WO 96/18688 | 6/1996 |
| WO | WO 96/18689 | 6/1996 |
| WO | WO 96/18695 | 6/1996 |
| WO | WO 96/18696 | 6/1996 |

* cited by examiner

*Primary Examiner*—Mark L. Bell
*Assistant Examiner*—Veronica F. Faison
(74) *Attorney, Agent, or Firm*—Fitzpatrick, Cella, Harper & Scinto

(57) ABSTRACT

The present invention relates to aqueous ink that exhibits characteristics based on cationic self-dispersing carbon black, and that has superior ejection stability even after suspension of printing. The aqueous ink includes cationic self-dispersing pigment, in which at least one cationic group is bound to the surface of the pigment directly or with another atomic group therebetween, a water-soluble organic solvent, and water. In addition to this, the aqueous ink contains an acidic compound including a proton in the structure thereof that can be dissociated due to dissolution into water, and having a dissociation stage of the proton with a dissociation constant of less than 1.

22 Claims, 18 Drawing Sheets

AQUEOUS INK, INK-JET RECORDING METHOD, RECORDING UNIT, INK CARTRIDGE, INK SET, AND INK-JET RECORDING APPARATUS

BACKGROUND OF THE INVENTION

1. Field of the Invention

The present invention relates to a aqueous ink, in particular, a aqueous ink suitable for ink-jet recording. The present invention also relates to an ink-jet recording method, a recording unit, an ink cartridge, an ink set, and an ink-jet recording apparatus.

2. Description of the Related Art

Regarding the ink-jet recording system, recording is performed by generating ink droplets by various ink ejection system, and by attaching the ink droplets to a recording material, for example, paper, so as to form ink dots. Examples of the ink ejection system include an electrostatic attraction system due to application of high voltage, a system in which mechanical vibration or displacement is applied to ink using a piezoelectric element, and a system in which the pressure of bubbling due to heating of ink. According to the ink-jet recording method, noise is reduced, and high-speed printing and multicolor printing can be performed.

Inks used for this method are required to perform so that, for example, images produced with the inks have high definition and have no feathering and no bleeding, and have excellent fastness, water resistance, rub resistance, etc.

In particular, a black ink should preferably be able to print characters which are excellent in quality, such as sharpness thereof, optical density and reproducibility of black color, since the primary use of the black ink is printing characters.

However, the black ink using a water-soluble dye is insufficient in water resistance and reproducibility of black color. Therefore, carbon black has been used as the coloring material. In order to use the carbon black as a water-soluble ink, however, it is necessary to stably disperse it in an aqueous medium. In Japanese Patent Laid-Open No. 3-210373, a method in which a water-soluble resin is used as a dispersing agent has been disclosed. As described above, in general, dispersion has been performed using the dispersing agent.

However, when inks using the aforementioned dispersing agents are used for ink-jet recording, clogs and non-ejection of the inks may occur depending on the resins constituting the dispersing agents. Furthermore, since aqueous pigment inks using the dispersing agents are viscous, there has been a problem in that sometimes, ejection became unstable during a long term of continuous ejection and high-speed printing.

On the other hand, in order to solve the aforementioned problems, dispersion methods without using dispersion agents have been disclosed in Japanese Patent Laid-Open No. 5-186704, Japanese Patent Laid-Open No. 8-3498, International Patent Publications WO96/18688, WO96/18689, and WO96/18696. These are methods in which water-soluble groups are introduced on the surface of the carbon black so as to stably disperse in aqueous media. Self-dispersing carbon black is cationically or anionically charged depending on the hydrophilic group on the surface thereof, has dispersibility in water due to repulsion of the ions thereof, and has improved hydrophilicity due to the hydrophilic group. As a consequence, the pigment ink stably dispersed in an aqueous medium during a long period of storage can be produced. An aqueous black ink using this carbon black as the coloring material provides excellent character quality and high image density, and the formed image has excellent water resistance, rub resistance, etc.

Among the aforementioned publications, in International Patent Publications WO96/18688, WO96/18689, and WO96/18696, the carbon black having a cationic hydrophilic group is disclosed. In particular, ink for ink-jet using cationic carbon black as a coloring material is disclosed in International Patent Publication WO96/18695. Furthermore, it is disclosed in Japanese Patent Laid-Open No. 10-183046 that bleeding between colors can be prevented by the combination of a black ink using the aforementioned cationic carbon black as a coloring agent and a color ink including an anionic material.

In the aforementioned publications, for example, International Patent Publication WO96/18696, it is described that an ink including self-dispersing carbon black containing an amine as a surface functional group is preferably made to be acidic in order to stabilize the dispersion state of the carbon black in the water.

SUMMARY OF THE INVENTION

In the present invention, it was discovered that not only in an ink including self-dispersing carbon black having an amine as a surface functional group, but also in an ink including self-dispersing carbon black having a cationic group as a surface functional group, the dispersibility of the self-dispersing carbon black in the ink could be further stabilized by controlling the pH thereof to be on the acidic side. When the pH of an ink including the cationic self-dispersing carbon black was controlled to be acidic, dispersibility of the carbon black was further stabilized. The reason for this is believed that the cationicity of the carbon black is stably maintained in the ink, and coagulation is not likely to occur due to electrical repulsive forces between the carbon black particles.

According to further research leading to the present invention, it was made clear that there was a technical problem that had to be solved in order to further stably form high quality images using an ink including cationic self-dispersing black. That is, when documents and images having blank portions are printed using the aforementioned ink, there were periods during which ejection of the ink from a nozzle is temporarily suspended in response to the blank. Thereafter, at the time of resumption of ink ejection, there were sometimes problems in that the ink to be ejected was not ejected, and ink ejection was fluctuated.

Accordingly, it is an object of the present invention to provide aqueous ink, which exhibits characteristics based on cationic self-dispersing carbon black, that is, for example, in an ink-jet recording apparatus, an image has high character quality and high image density, and furthermore, bleeding between anionic color ink and the aqueous ink is reduced, and wherein the ink has superior ejection stability even after temporary suspension of printing.

It is also an object of the present invention to provide an ink-jet recording method which can stably produce high quality prints.

It is also an object of the present invention to provide an ink-jet recording apparatus, a recording unit, and an ink cartridge, which can stably form high quality prints.

It is also an object of the present invention to provide an ink set which can be used for forming high quality prints.

The present invention is based on research on various inks in consideration of the aforementioned objects.

Consequently, it was discovered that by using an aqueous pigment ink as black ink, wherein the ink includes a cationic self-dispersing pigment, in which at least one cationic group bound to the surface of the pigment directly or with another atomic group therebetween, a water-soluble organic solvent, and water, and the ink contains an acidic compound including a proton in the structure thereof that is dissociated due to dissolution into water, and having a dissociation stage of the proton with a dissociation constant of less than 1, high character quality and high image density could be achieved, and superior ejection stability could be achieved even after temporary suspension of printing, while the characteristic was maintained, that is, bleeding between anionic color ink and the aqueous ink was reduced, so that the present invention has been made.

According to an aspect of the present invention, there is provided an aqueous ink comprising: a cationic self-dispersing pigment, in which at least one cationic group is bound to the surface of the pigment directly or with another atomic group therebetween; a water-soluble organic solvent; and water, wherein the aqueous ink comprises an acidic compound including a proton in the structure thereof that is dissociated due to dissolution into water, and having a dissociation stage of the proton with a dissociation constant of less than 1.

According to another aspect of the present invention, there is provided an aqueous ink comprising cationic self-dispersing carbon black, in which at least one cationic group is bound to the surface of the carbon black directly or with another atomic group therebetween, a water-soluble organic solvent, and water, wherein the aqueous ink comprises an acidic compound including a proton in the structure thereof that is dissociated due to dissolution into water, and having a dissociation stage of the proton with a dissociation constant of less than 1.

According to another aspect of the present invention, there is provided an ink-jet recording method comprising a step of performing recording on a recording material by ejecting an ink from an orifice in response to a recording signal is provided, wherein the ink is an aqueous ink comprising cationic self-dispersing carbon black, in which at least one cationic group is bound to the surface of the carbon black directly or with another atomic group therebetween, a water-soluble organic solvent, and water, and wherein the aqueous ink further comprises an acidic compound including a proton in the structure thereof that is dissociated due to dissolution into water, and having a dissociation stage of the proton with a dissociation constant of less than 1.

According to another aspect of the present invention, there is provided a recording unit comprising an ink container containing an ink and a head for ejecting the ink as ink droplets, wherein the ink is an aqueous ink containing cationic self-dispersing carbon black, in which at least one cationic group is bound to the surface of the carbon black directly or with another atomic group therebetween, a water-soluble organic solvent, and water, and wherein the aqueous ink further comprises an acidic compound including a proton in the structure thereof that is dissociated due to dissolution into water, and having a dissociation stage of the proton with a dissociation constant of less than 1.

According to another aspect of the present invention, there is provided an ink cartridge comprising an ink container containing the aforementioned ink.

According to another aspect of the present invention, there is provided an ink-jet recording apparatus comprising a recording unit comprising an ink container containing an ink and a head for ejecting the ink, wherein the ink is an aqueous ink containing cationic self-dispersing carbon black, in which at least one cationic group is bound to the surface of the carbon black directly or with another atomic group therebetween, a water-soluble organic solvent, and water, and wherein the aqueous ink further comprises an acidic compound including a proton in the structure thereof that is dissociated due to dissolution into water, and having a dissociation stage of the proton with a dissociation constant of less than 1.

According to another aspect of the present invention, there is provided an ink-jet recording apparatus comprising a recording head for ejecting the aforementioned ink, and an ink cartridge comprising an ink container containing the ink.

According to another aspect of the present invention, there is provided an ink set comprising a first aqueous ink and a second aqueous ink, wherein the first aqueous ink comprises cationic self-dispersing carbon black, in which at least one cationic group is bound to the surface of the carbon black directly or with another atomic group therebetween, a water-soluble organic solvent, and water, and wherein the first aqueous ink comprises an acidic compound including a proton in the structure thereof that is dissociated due to dissolution into water, and having a dissociation stage of the proton with a dissociation constant of less than 1.

Herein, in the case that the second aqueous ink containing an anionic coloring material is used, reaction can occur between the first and second inks by contacting the first and second inks in a liquid state on a recording medium, so that fixation of the coloring material can be further improved. When the second aqueous ink is color ink having a color tone different from the first aqueous ink, even if the first aqueous ink and the second aqueous ink are adjacently applied on the recording medium, bleeding at the boundary region therebetween can be effectively prevented.

Further objects, features and advantages of the present invention will become apparent from the following description of the preferred embodiments with reference to the attached drawings.

DESCRIPTION OF THE PREFERRED EMBODIMENTS

Figure 1:
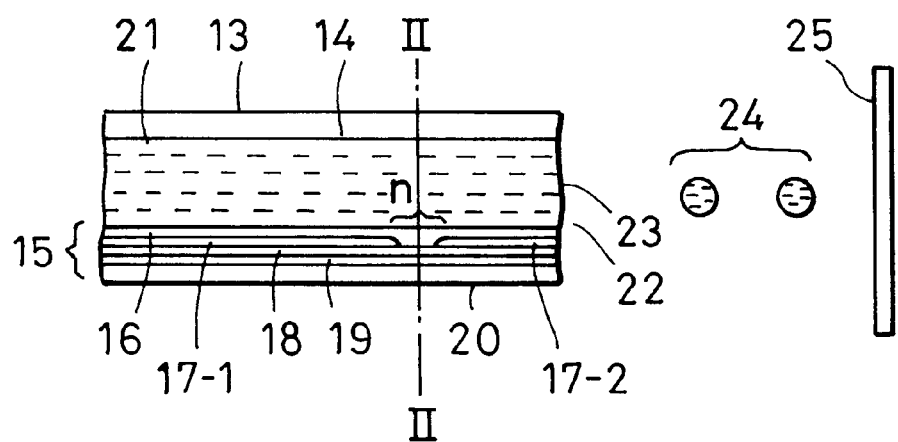
FIG. 1 is a vertical sectional view of an embodiment of a head of an ink-jet recording apparatus.

The aqueous ink according to the present invention includes cationic self-dispersing carbon black, a water-soluble organic solvent, and water, and in addition to this, the aqueous ink contains an acidic compound including a proton in the structure thereof that can be dissociated due to dissolution into water. The acidic compound has a dissociation stage of the proton with a dissociation constant (Ka) of less than 1. By using this ink, high character quality and high image density can be achieved, and superior ejection stability can be achieved even after suspension of printing, while a characteristic of the cationic self-dispersing carbon black is maintained, that is, bleeding between anionic color ink and the aqueous ink is reduced.

In the present invention, the acidic compound including a proton in the structure thereof and having a dissociation stage of the proton with a dissociation constant of less than 1, refers to a protonic acid having one dissociable proton and the proton has a dissociation constant of less than 1, or a protonic acid having at least two dissociable protons and having a dissociation stage of the proton with a dissociation constant of less than 1, among at least two dissociation stages thereof.

Herein, degree of dissociation refers to the ratio of the number of molecules being dissociated to the total number of original molecules. Regarding the dissociation stage, when an acid having n dissociable protons, $H_nA$, is taken as an example, a dissociation stage, in which $H_nA \rightarrow H_{n-1}A + H^+$ occurs, is specified as the first stage, and a dissociation stage, in which $H_{n-1}A \rightarrow H_{n-2}A + H^+$ occurs, is specified as the second stage.

For example, sulfuric acid $H_2SO_4$ has two dissociation stages, and dissociates into $H^+$ and $HSO_4^-$ at the first stage, and then, $HSO_4^-$ further dissociates into $H^+$ and $SO_4^{2-}$ at the second stage. Although the first stage dissociation constant of sulfuric acid is very large, since the second stage dissociation constant is less than 1, sulfuric acid is included in the aforementioned acidic compounds. On the other hand, as other compounds which have protons in the structure (molecule), for example, a hydroxide ion and an ammonia are mentioned. However, since these are not acidic compounds, these do not correspond to the acidic compounds according to the present invention.

Although the reason for the aforementioned effects of the aqueous ink according to the present invention is not clear, it is believed that in the ink according to the present invention, the change of ion concentration in the ink is relatively mild even if the ink composition changes due to evaporation of water from the ink at the nozzle tip compared to inks containing acidic compounds which only have dissociation stages with dissociation constants of 1 or more, so that salting out due to an increase in ion concentration in the ink is not likely to occur. That is, since the acidic compound having a dissociation stage with a dissociation constant of less than 1 exhibits a buffer action, the equilibrium shifts in the direction to cancel the change of the ink composition. Specifically, for example, when the ion concentration in the ink is increased due to evaporation of water from the ink, the equilibrium shifts in the direction to reduce the ion concentration. Therefore, it is believed that, at the nozzle tip, the increase in the ion concentration of the ink according to the present invention is mild compared to the inks containing acidic compounds which only have dissociation stages with dissociation constants of 1 or more, and consequently, the reduction of dispersion stability of the pigment, which is likely to occur due to the increase in the ion concentration of the ink, can be effectively prevented.

An anion (counter ion), which pairs with a cationic group bound to the surface of the self-dispersing carbon black, is preferably a conjugate base of a weak acid. The weak acid is specified to be an acid having a dissociation constant of less than 1.

When the anion, which pairs with a cationic group bound to the surface of the carbon black, is a conjugate base of the weak acid, by combining with the aforementioned acidic compounds, the buffer action against the change in the ion concentration is further increased. As a consequence, the dispersion stability of the ink including cationic self-dispersing carbon black can be further improved. That is, when water in the ink evaporates at the nozzle tip, since the dispersion stability is not degraded, the ejection after temporary suspension of printing is further stabilized.

Regarding the relationship between the added acidic compound and the counter ion, the difference of pKa therebetween is preferably within 5. This is because ions which can become counter ions to pair with cationic groups bound to the surface of the carbon black can be supplied, and consequently, the quantity of the counter ion in the ink is increased so as to further improve the dispersion stability.

Herein, the dissociation constant of the acidic compound which is compared with the dissociation constant of the acid of the counter ion refers to the largest dissociation constant among the proton dissociation constants of less than 1 with respect to the dissociation stages of that compound.

The Ka represents an acid dissociation constant that indicates an equilibrium constant in dissociation of the acid. The pKa represents a logarithmic value of the reciprocal of the acid dissociation constant, and is defined as follows, pKa=−logKa An acid having a large pKa is an acid having a small dissociation constant, and the pKa of a strong acid is a small value. Herein, a weak acid refers to an acid which has pKa exceeding 0, that is, the acid dissociation constant is less than 1. A difference of pKa within 5 indicates that the ratio of the acid dissociation constants is within 100,000.

The present invention will be explained below in detail using preferred embodiments according to the present invention, although the present invention is not limited to these.

Regarding the ink according to the present invention, the black ink used for the ink-jet recording method in which recording is performed by an ink-jet recording system is aqueous ink including cationic self-dispersing carbon black, in which at least one cationic group is bound to the surface of the carbon black directly or with another atomic group therebetween, a water-soluble organic solvent, and water, and in addition to this, the aqueous ink contains an acidic compound including a proton in the structure thereof that can be dissociated due to dissolution into water, and having a dissociation stage of at least one of the protons with a dissociation constant of less than 1.

The cationic self-dispersing carbon black used for the aforementioned ink is a self-dispersing carbon black, in which a cationic group is bound to the surface of the carbon black directly or with another atomic group therebetween.

In the present invention, the hydrophilic group, which is bound to the surface of the carbon black directly or with another atomic group therebetween, is preferably composed of at least one aromatic group, for example, phenyl group, benzyl group, phenacyl group, and naphthyl group, or heterocyclic group, for example, pyridyl group, and at least one cationic group. More preferably, the cationic group bound to the surface of the carbon black is a quaternary ammonium group. A quaternary phosphonium group may be used instead of the quaternary ammonium group.

As the cationic hydrophilic group, which is bound to the surface of the carbon black directly or with another atomic group therebetween, preferably used in the present invention, specifically, the group having the following structures can be mentioned.

N⁺ H₃
N⁺ R₃

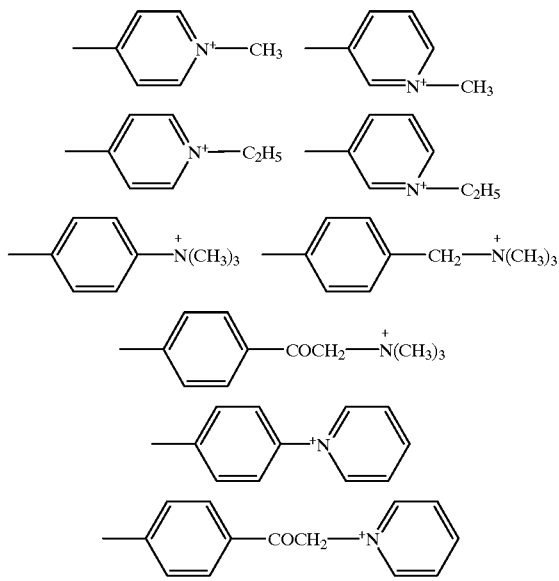

In the aforementioned formulae, R represents an alkyl group having 1 to 12 carbons, a substituted or unsubstituted phenyl group, or a substituted or unsubstituted naphthyl group. Herein, as the substituent for the phenyl group and naphthyl group, for example, halogen atoms (fluorine, chlorine, bromine, etc.) and straight chain or branched chain alkyl groups having 1 to 6 carbons, can be mentioned.

Since the carbon black cationically charged by introduction of the cationic group into the surface of the carbon black has superior dispersibility in water due to repulsion of the ions, when it is contained in the aqueous ink, the stable dispersion state can be maintained without addition of the dispersing agent, etc.

The aforementioned various cationic groups may be directly bound to the surface of the carbon black. The cationic groups may be indirectly bound to the surface of the carbon black with another atomic group therebetween. Herein, as the other atomic group, a straight chain or branched chain alkylene group having 1 to 12 carbons, a substituted or unsubstituted phenylene group, or a substituted or unsubstituted naphthylene group is preferable. As the substituent for the phenylene group and naphthylene group, for example, straight chain or branched chain alkyl groups having 1 to 6 carbons, can be mentioned.

As the counter ion to the cationic group, conjugate bases of various acids, for example, hydrochloric acid, nitric acid, hydrogen fluoride, hydrogen bromide, acetic acid, gluconic acid, benzoic acid, lactic acid, and formic acid, can be used, although as the counter ion to the self-dispersing carbon black used in the present invention, conjugate bases of weak acids, such as acetic acid, are preferable. Herein, the weak acid is specified to have an acid dissociation constant of less than 1, that is, to have a pKa greater than 0.

The aforementioned carbon black may be produced by known methods.

The content of the aforementioned carbon black in the ink is not specifically limited, although when the content is preferably specified to be within the range of 0.1% to 15% by weight relative to the total weight of the ink, and more preferably to be within the range of 1% to 10% by weight, sufficient image density can be achieved, and the dispersibility of the pigment in the ink can be stabilized.

The carbon black may be used alone, although at least two kinds thereof may be used concurrently.

As the acidic compound, which is added to the aqueous pigment ink according to the present invention, and that includes a proton in the structure thereof that can be dissociated due to dissolution into water, an acidic compound having a dissociation stage of at least one of the protons with a dissociation constant of less than 1, preferably more than $10^{-10}$, but less than 1, and more preferably more than $10^{-6}$, but less than 1, that is, a pKa of more than 0, preferably more than 0, but less than 10, more preferably more than 0, but less than 6, is suitable.

Specific acidic compounds are described below. As the acidic compound having one dissociable proton, acrylic acid, anisic acid, aminobutyric acid, benzoic acid, isovaleric acid, isobutyric acid, octanoic acid, formic acid, valeric acid, glycolic acid, gluconic acid, crotonic acid, cinnamic acid, acetic acid, cyclohexanecarboxylic acid, naphthoic acid, lactic acid, vinylacetic acid, phenylacetic acid, propionic acid, hexanoic acid, butyric acid, etc., can be mentioned. As the acidic compound having at least two dissociable protons, adipic acid, ascorbic acid, azelaic acid, sulfuric acid, phosphoric acid, citric acid, glutamic acid, succinic acid, salicylic acid, oxalic acid, tartaric acid, hydroxybenzoic acid, pimelic acid, phthalic acid, fumaric acid, boric acid, maleic acid, etc., can be mentioned.

At least two kinds of the acidic compounds may be used concurrently.

Regarding the combination of the conjugate acid of the counter ion appropriately used in the present invention and the acidic compound to be added, the difference of pKa therebetween is preferably within 5.

Herein, the dissociation constant of the acidic compound which is compared with the dissociation constant of the acid of the counter ion refers to the largest dissociation constant among the proton dissociation constants of less than 1 regarding the dissociation stages of that compound.

The addition quantities of these acidic compounds may be appropriately chosen based on the kinds of the acids, the kinds of the cationic self-dispersing carbon black, concentrations, etc., although the acidic compounds are preferably added in order that the pH of the ink becomes acidic, more specifically, the pH of the ink becomes 6 or less, and more preferably, becomes 3 to 6.

The concentration of the acidic compound in the ink is preferably 0.1 mol/L or less, and more preferably, is 0.05 mol/L or less. When the concentration is in the aforementioned range, the ionic strength in the ink is increased, and the dispersion stability of the self-dispersing carbon black is not reduced, so that the effects of the present invention can be sufficiently exhibited.

As the water-soluble organic solvent used for the pigment ink according to the present invention, for example, amides, e.g., dimethylformamide and dimethylacetamide, ketones, e.g., acetone, ethers, e.g., tetrahydrofuran and dioxane, polyalkylene glycols, e.g., polyethylene glycol and polypropylene glycol, alkylene glycols in which the alkylene group has 2 to 6 carbons, e.g., ethylene glycol, propylene glycol, butylene glycol, triethylene glycol, 1,2,6-hexanetriol, thiodiglycol, hexylene glycol, and diethylene glycol, glycerins, lower alkyl ethers of polyhydric alcohols, e.g., ethylene glycol monomethyl(or ethyl) ether, diethylene glycol monomethyl(or ethyl) ether, and triethylene glycol monomethyl(or ethyl) ether, cyclic amide compounds, e.g., N-methyl-2-pyrrolidone, 1,3-dimethyl-2-imidazolidinone, triethanolamine, sulfolane, dimethyl sulfoxide, 2-pyrrolidone, and c-caprolactam, and imide compounds, e.g., succinimide, can be mentioned. These water-soluble organic solvents may be used alone, although at least two kinds thereof may be used concurrently.

The content of the aforementioned water-soluble organic solvents in the ink is, in general, preferably 10% to 50% by weight relative to the total weight of the ink, and more preferably, is 15% to 40% by weight.

As the water, pure water or ion-exchanged water may preferably be used. The content of this water in the ink is, in general, preferably 30% to 80% by weight relative to the total weight of the ink. When the water is excessively reduced, the viscosity of the ink is increased. When the water is excessively increased, since components to be evaporated become excess, various characteristics of the ink may be affected during evaporation, due to the excess of components that are to be evaporated.

In addition to this, additives, for example, surfactants, preservatives, antioxidants, pH regulators, and water-soluble polymers, may be appropriately blended into the ink according to the present invention.

Ink Set

The aqueous ink according to the present invention as described above can be combined with other inks so as to constitute an ink set, and consequently, an image having further high quality can be formed. For example, regarding the combination of the aqueous ink according to the present invention, which is referred to as a first ink, and an aqueous ink, which is referred to as a second ink, when the second ink is a aqueous ink including an anionic coloring material, by contacting the first and second inks with each other in a liquid state, for example, on a recording medium, both can react with each other.

As the anionic coloring material, for example, anionic self-dispersing pigments, pigments and anionic dispersing agents thereof, and furthermore, anionic dyes, can be mentioned.

The second aqueous ink may be black ink similar to the first aqueous ink, or may be color ink having a color other than black. When the second aqueous ink is a black ink, by superimposing the first and the second inks on the recording medium, a black print having further high quality can be formed.

When the second aqueous ink is a color ink, bleeding at the boundary between the first aqueous ink and the second aqueous ink, which are applied adjacent to each other on the recording medium, can be effectively prevented. Even if the second aqueous ink is the color ink, by superimposing it and the first ink on the recording medium, the fixation of the first aqueous ink can be improved.

Next, the recording method using the aqueous ink according to the present invention will be explained. As the method and apparatus suitable for performing the recording using the ink according to the present invention, an ink-jet recording method and an ink-jet recording apparatus, in which thermal energy is applied to ink in a chamber of a recording head in response to a recording signal, and liquid droplets are generated due to the thermal energy, can be mentioned.

Figure 2:
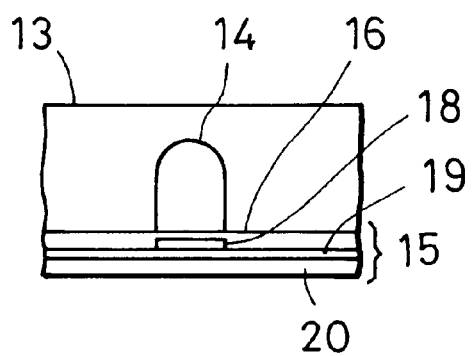
FIG. 2 is a sectional view of the section indicated by line II—II shown in FIG. 1.

FIG. 1 and FIG. 2 show an example of a configuration of a head which is a primary part of the apparatus using thermal energy. The apparatus is an ink-jet recording apparatus with which the ink set according to the present invention can be used.

FIG. 1 is a sectional view of a head 13 along an ink flow path. FIG. 2 is a sectional view of the section indicated by line II—II shown in FIG. 1. The head 13 is produced by adhering a glass, ceramic, silicon, or plastic board, etc., having a flow path (nozzle) 14 for ink and a heater element substrate 15. The heater element substrate 15 is composed of a protection layer 16 made of silicon oxide, silicon nitride, silicon carbide, etc., electrodes 17-1 and 17-2 made of aluminum, gold, aluminum-copper alloys, etc., a heating resistor layer 18 made of high melting point material, for example, HfB$_2$, TaN, TaAl, etc., a heat storage layer 19 made of thermally oxidized silicon, aluminum oxide, it etc., and substrate 20 made of heat-dissipating material, for example, silicon, aluminum, and aluminum nitride.

When an electrical pulse signal is applied to the electrodes 17-1 and 17-2 of the aforementioned head 13, a region indicated by 'n' of the heater element substrate 15 is rapidly heated, and a bubble is generated in ink 21 in contact with this surface. Subsequently, meniscus 23 is extruded due to the generated pressure, and the ink 21 is ejected through a nozzle 14 of the head, and is ejected as ink droplets 24 from an ejection orifice 22 toward a recording material 25.

Figure 3:
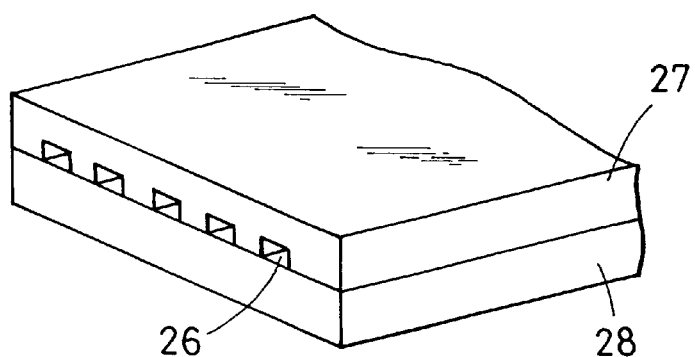
FIG. 3 is a schematic diagram for illustrating a multihead.

FIG. 3 is an external view of a multihead in which many heads shown in FIG. 1 are arranged. This multihead is produced by adhering a glass board 27 having a multinozzle 26 and a heater head 28 similar to that explained in FIG. 1.

Figure 4:
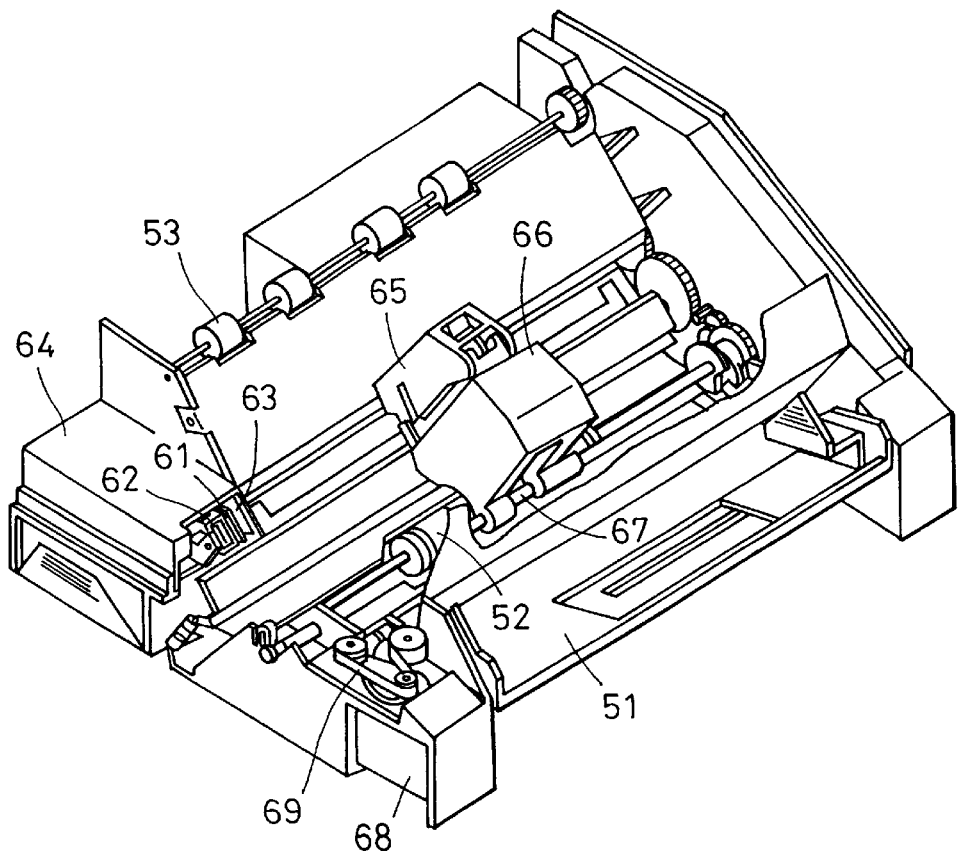
FIG. 4 is a schematic perspective view of an embodiment of an ink-jet recording apparatus.

FIG. 4 shows an embodiment of an ink-jet recording apparatus in which the head as explained above is incorporated. In FIG. 4, an end of a blade 61 as a wiping member is held and fixed by a blade-holding member so as to have the form of a cantilever. The blade 61 is deployed at a position adjacent to a recording region for the recording head 65, and in the present embodiment, the blade 61 is held protruding into the path of the movement of the recording head 65.

A cap 62 is a cap for an ejection outlet face of the recording head 65, and is deployed at the home position adjacent to the blade 61. The cap 62 moves in the direction perpendicular to the direction of the movement of the recording head 65 and contacts the ejection outlet face so as to perform capping. Ink absorbent 63 is deployed adjacent to the blade 61, and is held protruding into the path of the movement of the recording head 65 in a manner similar to that of the blade 61. An ejection recovery portion 64 is composed of the aforementioned blade 61, cap 62, and ink absorbent 63, and water, dust, and the like on the ejection outlet face are removed by the blade 61 and the ink absorbent 63.

The recording head 65 has an ejection energy generation device and ejects the ink toward the recording material facing an ejection outlet face provided with an ejection outlet so as to perform the recording. A carriage 66 has a recording head 65 mounted on it so as to carry the recording head 65. The carriage 66 slidably engages a guide shaft 67, and a part of the carriage 66 connects with a belt 69 driven with a motor 68, although not shown in the drawing. Thus, the carriage 66 can move along the guide shaft 67, and therefore, the recording head 65 can move to the recording region and the region adjacent thereto. A feeder 51 inserts the recording material. A feed roller 52 is driven with a motor, although not shown in the drawing.

According to these configurations, the recording material is fed to a position facing the ejection outlet face of the recording head 65, and is discharged to a discharge portion provided with a discharge roller 53 during the recording. Regarding the aforementioned configurations, when the recording head 65 returns to the home position in accordance with the completion of the recording, the blade 61 protrudes into the path of the movement of the recording head 65, while the cap 62 in the ejection recovery portion 64 recedes from the path of the movement. As a consequence, the ejection outlet face of the recording head 65 is wiped.

When the cap 62 contacts the ejection outlet face of the recording head 65 in order to perform capping, the cap 62 moves so as to protrude into the path of the movement of the recording head 65. When the recording head 65 moves from the home position to the recording start position, the cap 62 and the blade 61 are located at the same position as that in the aforementioned wiping. As a consequence, the ejection outlet face of the recording head 65 is also wiped during this movement.

The recording head moves to the home position at the time of the completion of the recording and the ejection recovery. In addition to this, when the recording head moves between recording regions for recording, the recording head moves to the home position adjacent to the recording to region at predetermined intervals so that the aforementioned wiping is also performed accompanying this movement.

Figure 5:
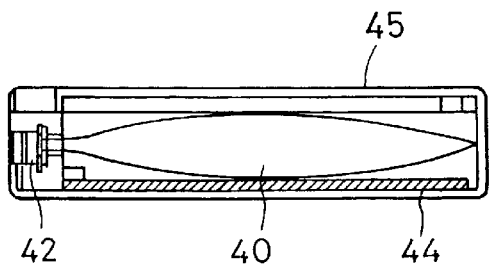
FIG. 5 is a vertical sectional view of an embodiment of an ink cartridge.

FIG. 5 shows an embodiment of an ink cartridge 45 storing the ink to be supplied to the recording head through an ink supply member, for example, a tube. Herein, the ink storage portion or ink bag 40 for storing the supply of ink is, for example, an ink bag having a rubber stopper 42 at the end. The ink in the ink bag 40 can be fed to the head by a needle, although not shown in the drawing, inserted into the stopper 42. Ink absorbent 44 receives the waste ink. The face of the ink storage portion contacting the ink is preferably made of polyolefin, in particular, polyethylene.

Figure 6:
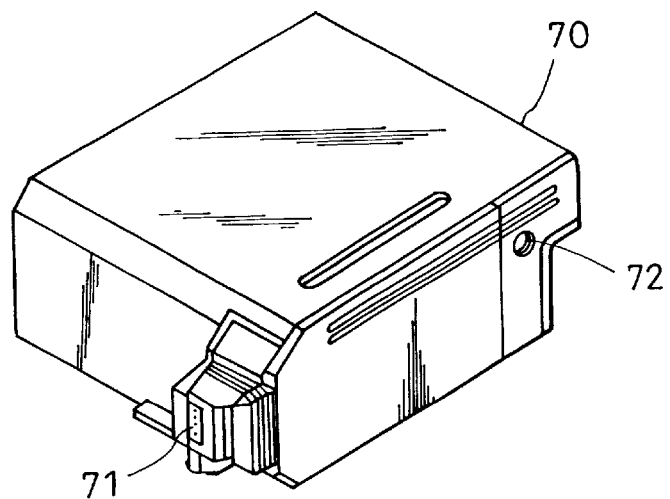
FIG. 6 is a perspective view of an embodiment of a recording unit.

The ink-jet recording apparatus usable for the present invention is not limited to the aforementioned ink-jet recording apparatus in which the head and the ink cartridge are separated. An ink-jet recording apparatus, in which the head and the ink cartridge are integrated as shown in FIG. 6, is also suitable for the present invention. In FIG. 6, an ink storage portion storing the ink, for example, an ink absorbent, is stored in a recording unit 70, and the ink in the ink absorbent is ejected as ink droplets from a head portion 71 including a plurality of orifices. As the material of the ink absorbent, polypropylene is preferably used in the present invention. A configuration in which the ink storage portion is an ink bag provided with a spring therein instead of the ink absorbent may be adopted. The inside of the cartridge is communicated with air through a ventilation hole 72. This recording unit 70 is used instead of the recording head 65 as shown in FIG. 4, and can be freely attached to, or detached from, the carriage 66.

Next, as an embodiment of the ink-jet recording apparatus using mechanical energy, an on-demand ink-jet recording head can be mentioned, which is provided with a nozzle formation substrate having a plurality of nozzles, a pressure generation element composed of a piezoelectric material arranged facing the nozzle and a conductive material, and ink filling the surroundings of the pressure generation element, and which displaces the pressure generation element by application of voltage, and ejects small droplets of the ink from the nozzle.

Figure 7:
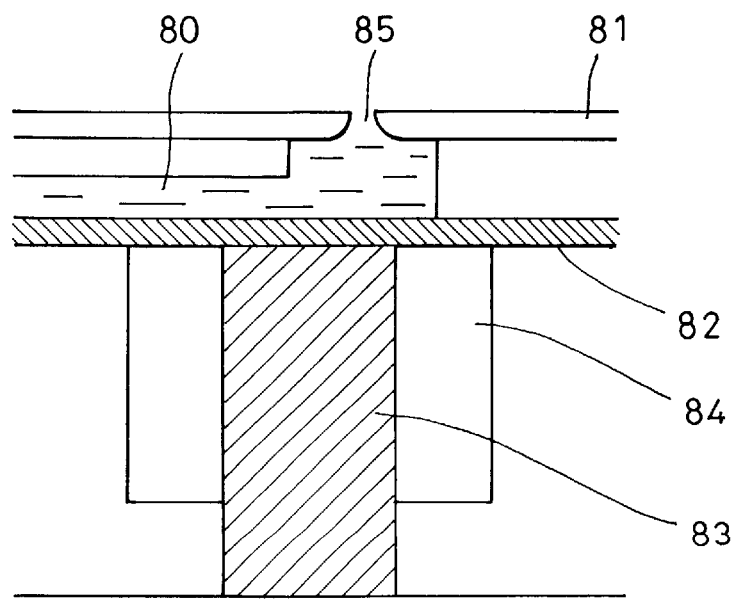
FIG. 7 is a vertical sectional view of another embodiment of a head for an ink-jet recording apparatus.

FIG. 7 shows an embodiment of a configuration of a recording head which is a primary part of the aforementioned recording apparatus. The head of this embodiment is composed of an ink flow path 80 connected to an ink chamber, although not shown in the drawing, an orifice plate 81 for ejecting a desired volume of ink droplets, a vibration plate 82 which directly applies pressure to the ink, a piezoelectric element 83 which is jointed with the vibration plate 82, and is displaced by an electrical signal, and a substrate 84 for supporting and fixing the orifice plate 81, vibration plate 82, etc.

In FIG. 7, the ink flow path 80 is formed from photosensitive resin, etc. Regarding the orifice plate 81 made of stainless steel, nickel, etc., an ejection outlet 85 is formed therein by punching, etc., using the electroforming method, stamping method, etc. The vibration plate 82 is formed from, for example, a metal film of stainless steel, nickel, titanium, etc., and a highly elastic resin film. The piezoelectric element 83 is formed from a dielectric material, for example, barium titanate and PZT.

In order to perform recording, the recording head having the aforementioned configuration applies a pulse voltage to the piezoelectric element 83, and generates strain stress with a result that the energy thereof deforms the vibration plate 82 jointed with the piezoelectric element 83 so as to vertically apply pressure to the ink in the ink flow path 80, and ejects ink droplets, although not shown in the drawing, from the ejection outlet 85 of the orifice plate 81.

The aforementioned recording head is used after being incorporated into a recording apparatus similar to that shown in FIG. 4. Detailed actions of the recording apparatus may be similar to those described above.

Other specific embodiments of the recording apparatus and the recording head preferably used for the present invention will be explained below.

Figure 8:
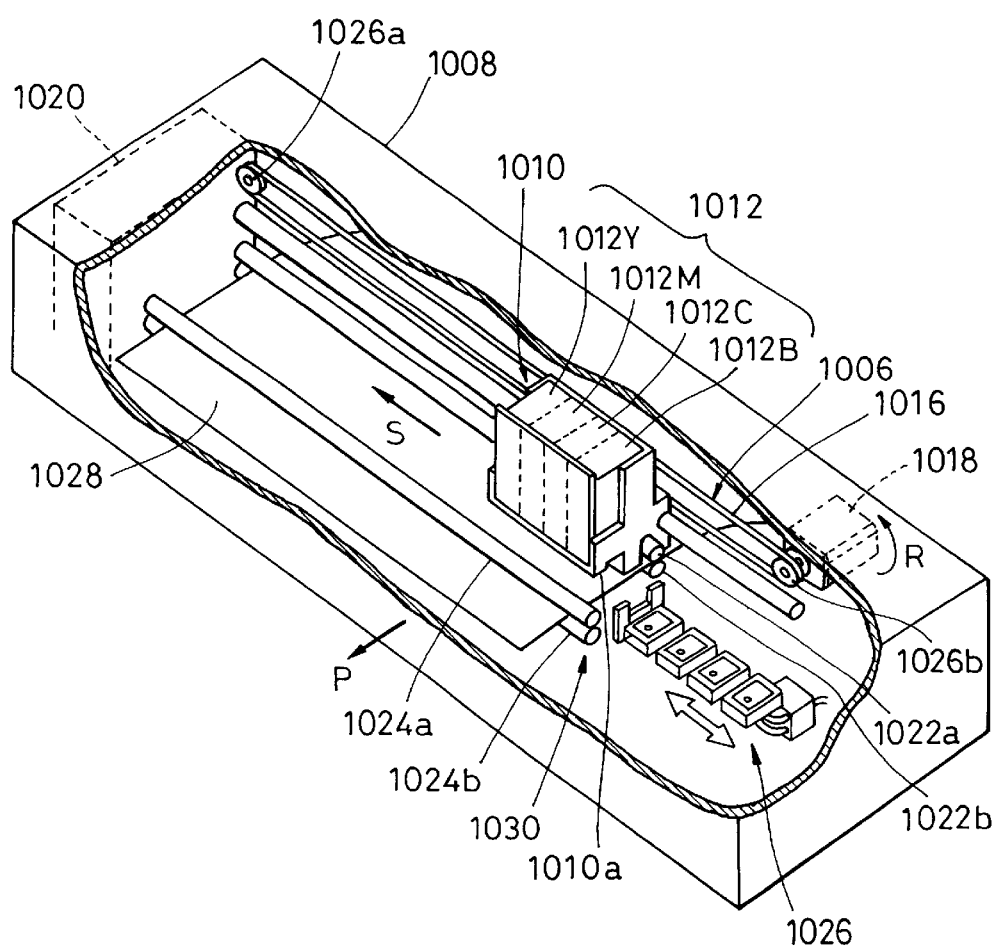
FIG. 8 is a schematic perspective view of a key portion of an ink-jet printer on which a liquid ejection head can be mounted.

FIG. 8 is a schematic perspective view of a liquid ejection head suitable for the present invention as a liquid ejection head according to the ejection system in which bubbles are communicated with air at the time of the ejection, and the key portion of an embodiment of an ink-jet printer as a liquid ejection apparatus using the aforementioned liquid ejection head.

The ink-jet printer, as shown in FIG. 8, is composed of a conveyer 1030 for intermittently conveying the paper 1028 as the recording medium, set along the longitudinal direction, in the direction indicated by the arrow P as shown in FIG. 8, a recording portion 1010 reciprocated in the direction nearly parallel to the direction S and nearly orthogonal to the direction P of the conveyance of the paper 1028 by the conveyer 1030, and a movement drive part 1006 as a drive device for reciprocating the recording portion 1010 in a casing 1008.

The conveyer 1030 is provided with a pair of roller units 1022a and 1022b and a pair of roller units 1024a and 1024b, which are nearly parallel-opposed to each other, and a drive portion 1020 for driving each of these roller units. According to this, when the drive portion 1020 is actuated, the paper 1028 is held between each of the roller units 1022a and 1022b, and the roller units 1024a and 1024b, and is intermittently conveyed in the direction indicated by the arrow P as shown in FIG. 8.

The movement drive portion 1006 is composed of a belt 1016 looped over pulleys 1026a and 1026b deployed on revolving shafts opposed to each other with a predetermined distance therebetween, and a motor 1018 for driving, in the forward and reverse directions, the belt 1016 which is arranged nearly parallel to the roller units 1022a and 1022b and connected with a carriage member 1010a of the recording portion 1010.

When the motor 1018 is actuated and the belt 1016 is rotated in the direction indicated by the arrow R as shown in FIG. 8, the carriage member 1010a of the recording portion 1010 is moved in the direction indicated by the arrow S as shown in FIG. 8 by a predetermined moving distance. When the motor 1018 is actuated and the belt 1016 is rotated in the direction reverse to the direction indicated by the arrow R as shown in FIG. 8, the carriage member 1010a of the recording portion 1010 is moved in the direction reverse to the direction indicated by the arrow S as shown in FIG. 8 by a predetermined moving distance. At one end of the movement drive portion 1006, a recovery unit 1026 for performing the ejection recovery treatment of the recording portion 1010 is deployed at the home position of the carriage member 1010a facing the ink ejection outlets of the recording portion 1010.

In the recording portion 1010, ink-jet cartridges (hereafter may be abbreviated as cartridge 1012) 1012Y, 1012M, 1012C, and 1012B are deployed for each of the colors, for example, yellow, magenta, cyan, and black so as to freely attach to, or detach from, the carriage member 1010a.

Figure 9:
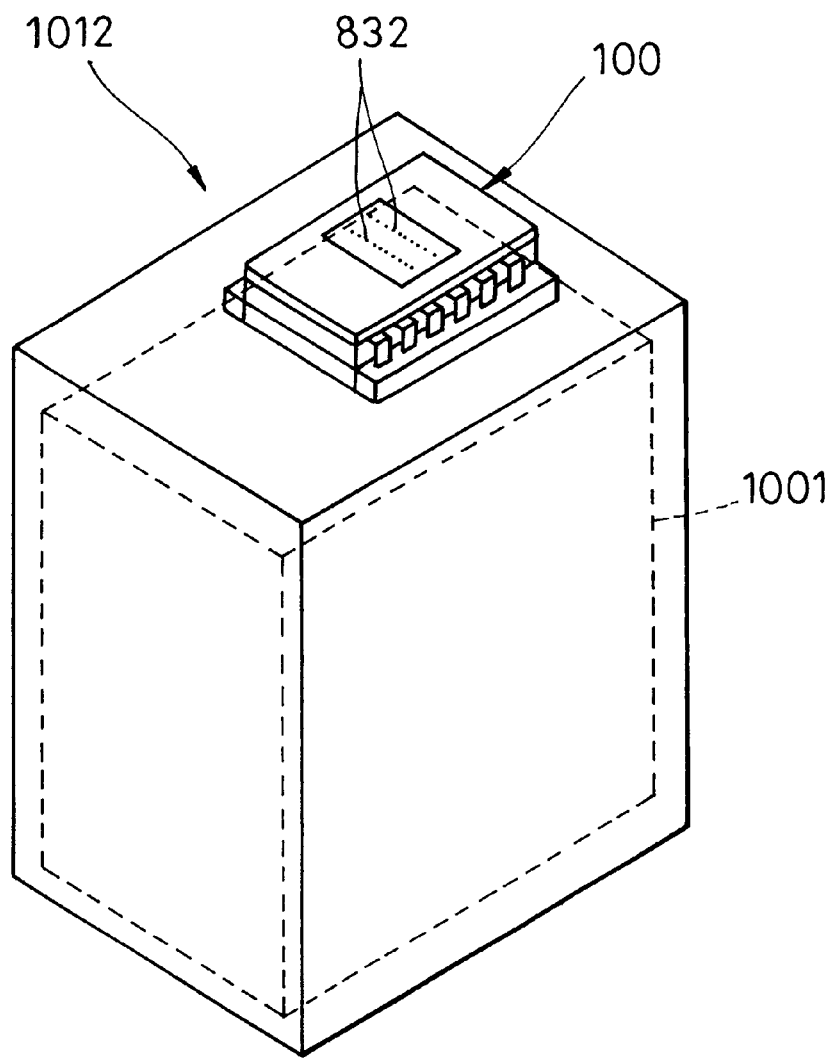
FIG. 9 is a schematic perspective view of an embodiment of an ink-jet cartridge provided with a liquid ejection head.
Figure 10:
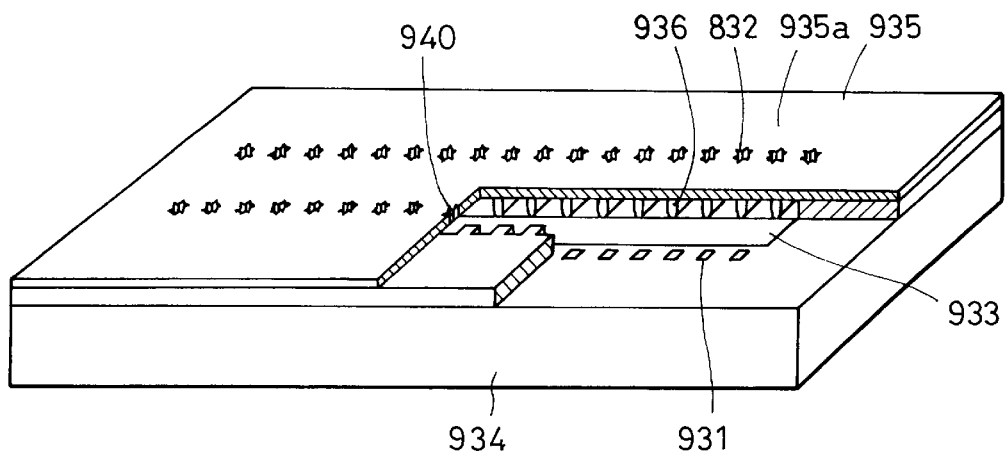
FIG. 10 is a schematic perspective view showing a key portion of a liquid ejection head used in the ink-jet cartridge shown in FIG. 9.

FIG. 9 shows an embodiment of the ink-jet cartridge which can be mounted on the aforementioned ink-jet recording apparatus. The ink-jet cartridge 1012 according to the present embodiment is a serial type cartridge and the primary part thereof is composed of an ink-jet recording head 100 and a liquid tank 1001 for storing the liquid, for example, the ink. The ink-jet recording head 100 is provided with many ejection outlets 832 for ejecting the liquid, and the liquid, for example, the ink, is supplied from the liquid tank 1001 to a common liquid chamber, as shown in FIG. 10, of the ink-jet recording head 100 through a liquid feed path, although not shown in the drawing. The cartridge 1012 is composed of the ink-jet recording head 100 and the liquid tank 1001, which are integrated, and the liquid tank 1001 can be replenished with the liquid, if necessary. However, the configuration, in which the liquid tank 1001 is exchangeably connected to the ink-jet recording head 100, may be adopted.

Specific embodiments of the ink-jet recording head, also called a liquid ejection head, which can be mounted on the ink-jet printer having the aforementioned configuration, will be explained below in further detail.

Figure 11:
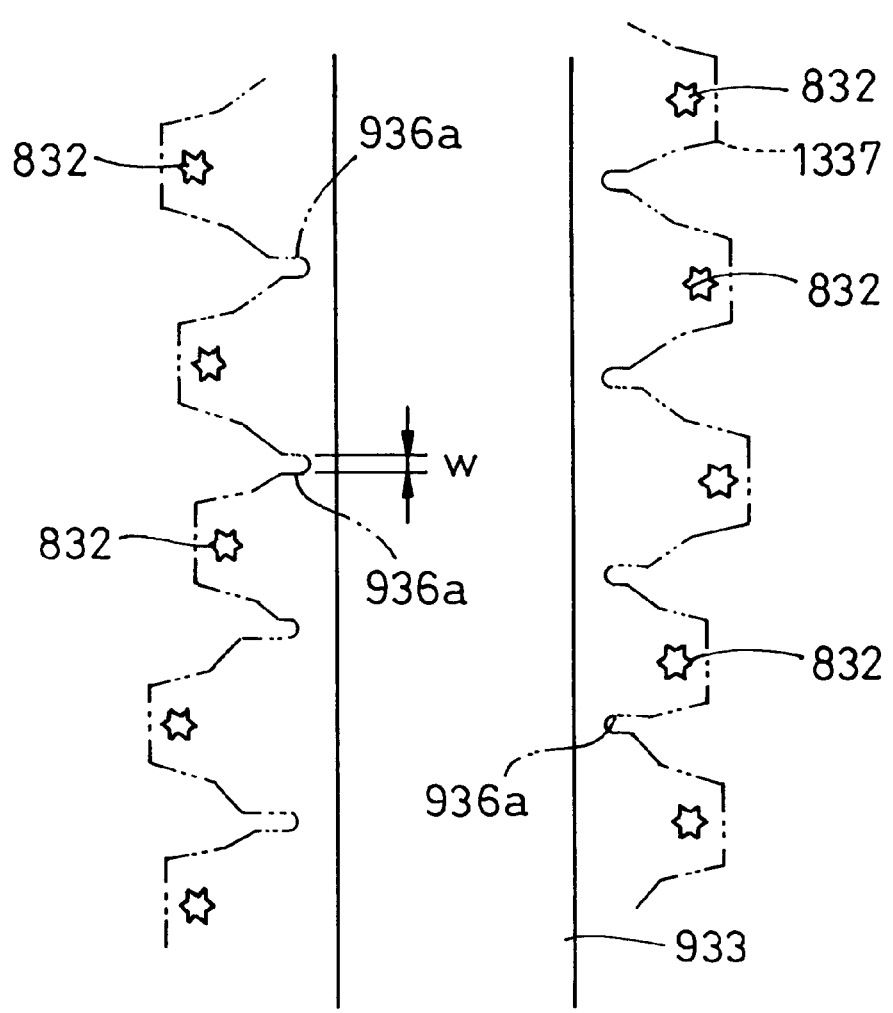
FIG. 11 is a conceptual diagram showing a portion of the liquid ejection head shown in FIG. 10.
Figure 12:
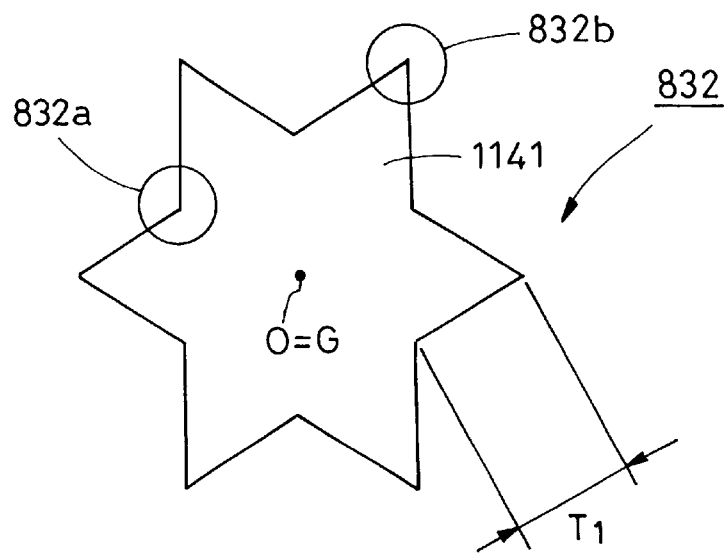
FIG. 12 is an enlarged diagram of an ejection outlet shown in FIG. 11.
Figure 13:
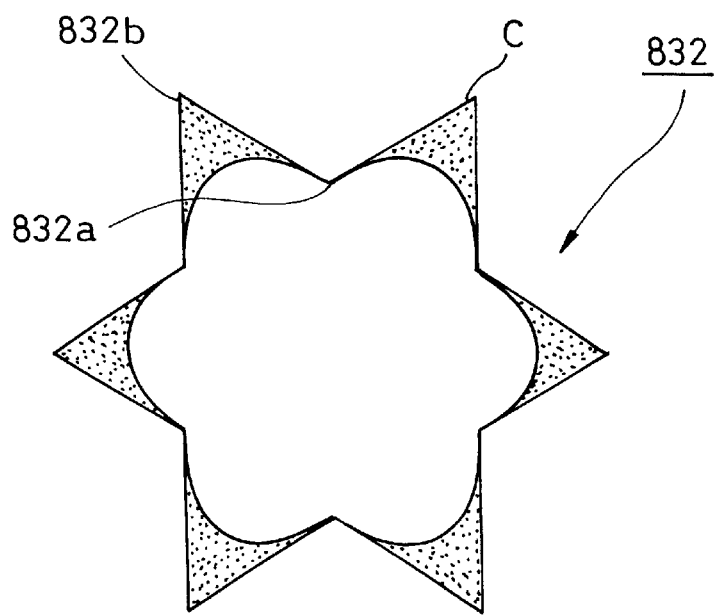
FIG. 13 is a schematic diagram illustrating adhesion of the ink to the ejection outlet shown in FIG. 12.

FIG. 10 is a schematic perspective view showing a key portion of a liquid ejection head according to a basic embodiment of the present invention. FIGS. 11 to 13 are views showing the shape of the ejection outlets of the liquid ejection head as shown in FIG. 10. Herein, electrical wiring, etc., for driving the electrothermal transducer element are omitted.

In the liquid ejection head according to the present embodiment, for example, as shown in FIG. 10, a substrate 934 made of glass, ceramic, plastic, metal, etc., is used. The material of the aforementioned substrate is not essential and is not specifically limited as long as the substrate functions as a part of the members constituting the flow path, and can function as a support member for an ink ejection energy generation element and the material layer forming the liquid flow path and the ejection outlet as described below. In the present embodiment, explanations are made of the case in which a silicon (Si) substrate (wafer) is used. The ejection outlet can be formed using a laser beam. In addition to this, the ejection outlet may be formed, for example, with an exposure apparatus such as MPA (Mirror Projection Aligner) using an orifice plate (ejection outlet plate) 935, described below, as a photosensitive resin.

In FIG. 10, a substrate 934 is provided with an electrothermal transducer element (hereafter may be described as heater) 931 and an ink supply hole 933, which is a long groove type penetration hole, as a common liquid chamber portion. Along both sides in the longitudinal direction of the ink supply hole 933, the heaters 931 as the energy generation device are staggered in one row on each side, for example, at intervals of 300 dpi between adjacent electrothermal transducer elements. Ink flow path walls 936 for forming the ink flow path are deployed on the substrate 934. On the ink flow path walls 936, an ejection outlet plate 935 including ejection outlets 832 is deployed.

In FIG. 10, the ink flow path walls 936 and the ejection outlet plate 935 are shown as different members. However, the ink flow path walls 936 and the ejection outlet plate 935 can be formed as a single member by forming the ink flow path walls 936 on the ejection outlet plate 935 using, for example, a spin coat method. In the present embodiment, the upper side of the ejection outlet face 935a is treated to be water-repellent.

In the present embodiment, a serial type head, which performs recording while scanning in the direction indicated by the arrow S in FIG. 8, is used for recording at, for example, 1200 dpi. The driving frequency is 10 kHz and one ejection outlet performs ejections at every 100 μs when in the shortest time intervals.

Figure 14:
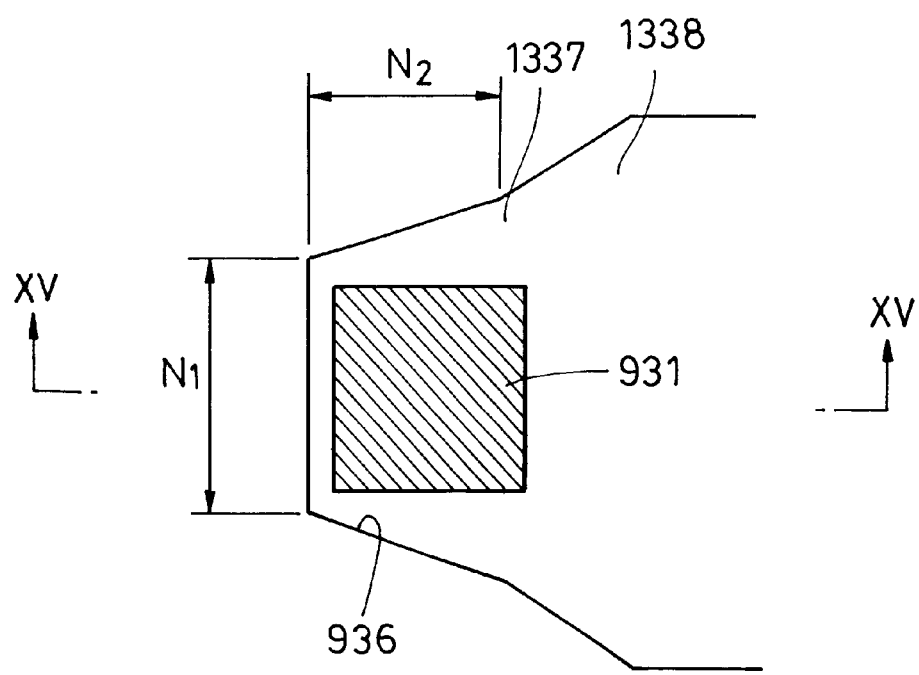
FIG. 14 is a schematic diagram of a primary part of the liquid ejection head shown in FIG. 11.

Regarding the practical dimensions of the head, for example, as shown in FIG. 11, partitions 936a for separating the liquids of adjacent nozzles have a width w of 14 μm. As shown in FIG. 14, a bubbling chamber 1337, in ink flow path 1338, is formed with the ink flow path wall 936 and has a width $N_1$ of 33 μm, and a length $N_2$ of 35 μm. The heater 931 has dimensions of 30 μm by 30 μm, the heater resistance is 53 Ω, and the driving voltage is 10.3 V. The ink flow path wall 936 and the partitions 936a each having a height of 12 μm can be used, and an ejection outlet plate 935 having a thickness of 11 μm can be used.

Among the sections of an ejection outlet portion 940 deployed in the ejection outlet plate 935 including the ejection outlets 832, a section cut in the direction orthogonal to the direction of the ink ejection (the direction of the thickness of the orifice plate 935) is nearly in the shape of a star, which is approximately composed of six convex portions 832a having a obtuse angle and six concave portions 832b having an acute angle, so that the convex portion 832a and the concave portions 832b are alternately arranged. That is, six grooves 1141 are formed in the direction of the thickness of the orifice plate (the direction of the liquid ejection) as shown in FIG. 10, in which the concave portion 832b makes the distal portion as a region located far from the center O of the ejection outlet, and the convex portion 832a adjacent thereto makes the proximal portion as a region near to the center O of the ejection outlet.

In the present embodiment, regarding the ejection outlet 832, for example, a section cut in the direction orthogonal to the direction of the thickness of the orifice plate has a shape in which two equilateral triangles having a side length of 27 μm are overlapped while one of them is rotated by 60 degrees, so that the length $T_1$ as shown in FIG. 12 is 8 μm. The angle of every convex portion 832a is 120 degrees, and the angle of every concave portion 832b is 60 degrees. Therefore, the center O of the ejection outlet and the median point G of the polygon formed by connecting the centers of each of the adjacent grooves, that is, the centers (median points) of the figure formed by connecting the distal point of the groove and the two proximal points adjacent to the distal point, are identical. In the present embodiment, the area of the opening of the ejection outlet 832 is 400 μm², and the area of the opening of the groove, that is, the area of the figure formed by connecting the distal point of the groove and the two proximal points adjacent to the distal point, is about 33 μm² per groove. FIG. 13 is a schematic diagram illustrating adhesion status of the ink to the ejection outlet shown in FIG. 12. In FIG. 13, 'C' shows an ink-attached portion.

Figure 15:
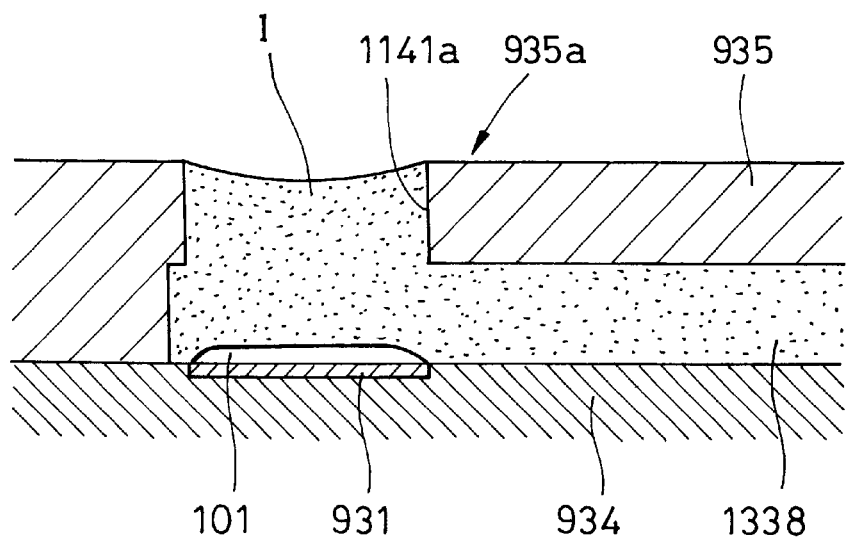
FIG. 15 is a schematic sectional view of the section indicated by arrows XV—XV shown in FIG. 14, for illustrating the actions of a liquid varying with time during the ejection of the liquid at a liquid ejection head, together with FIGS. 16 to 22.
Figure 16:
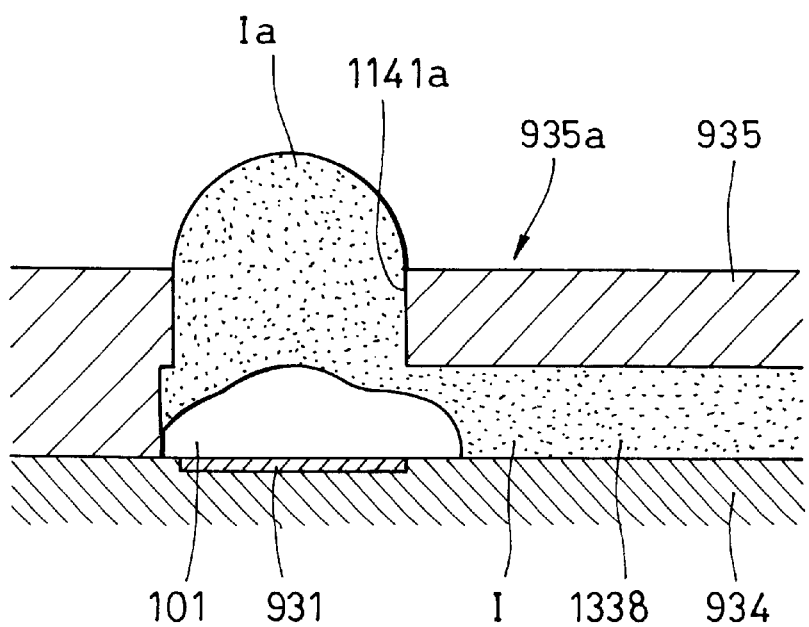
FIG. 16 is a schematic sectional view of the section indicated by arrows XV—XV shown in FIG. 14, for illustrating the actions of a liquid varying with time during the ejection of the liquid at a liquid ejection head, together with FIGS. 15, and 17 to 22.
Figure 17:
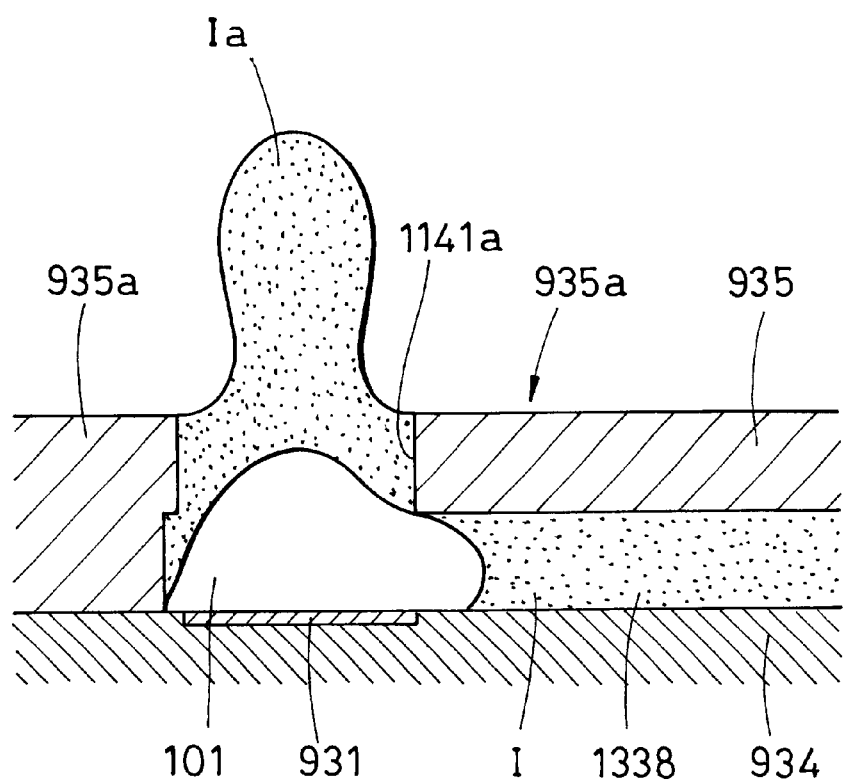
FIG. 17 is a schematic sectional view of the section indicated by arrows XV—XV shown in FIG. 14, for illustrating the actions of a liquid varying with time during the ejection of the liquid at a liquid ejection head, together with FIGS. 15, 16, and 18 to 22.
Figure 18:
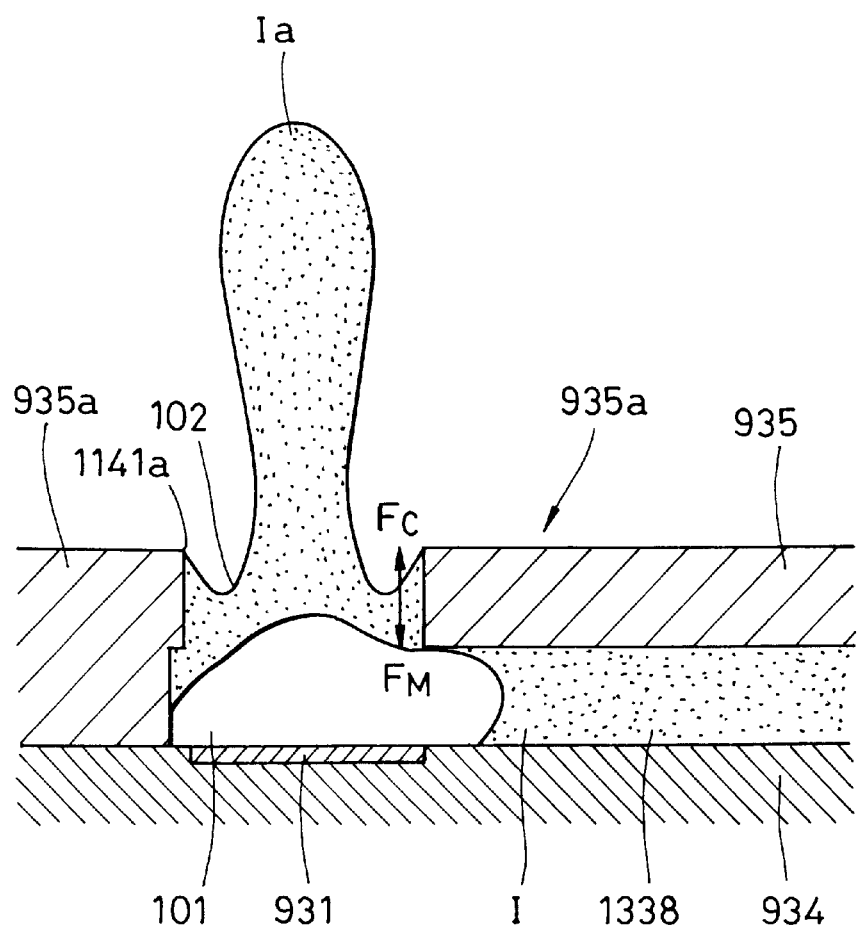
FIG. 18 is a schematic sectional view of the section indicated by arrows XV—XV shown in FIG. 14, for illustrating the actions of a liquid varying with time during the ejection of the liquid at a liquid ejection head, together with FIGS. 15 to 17, and 19 to 22.
Figure 19:
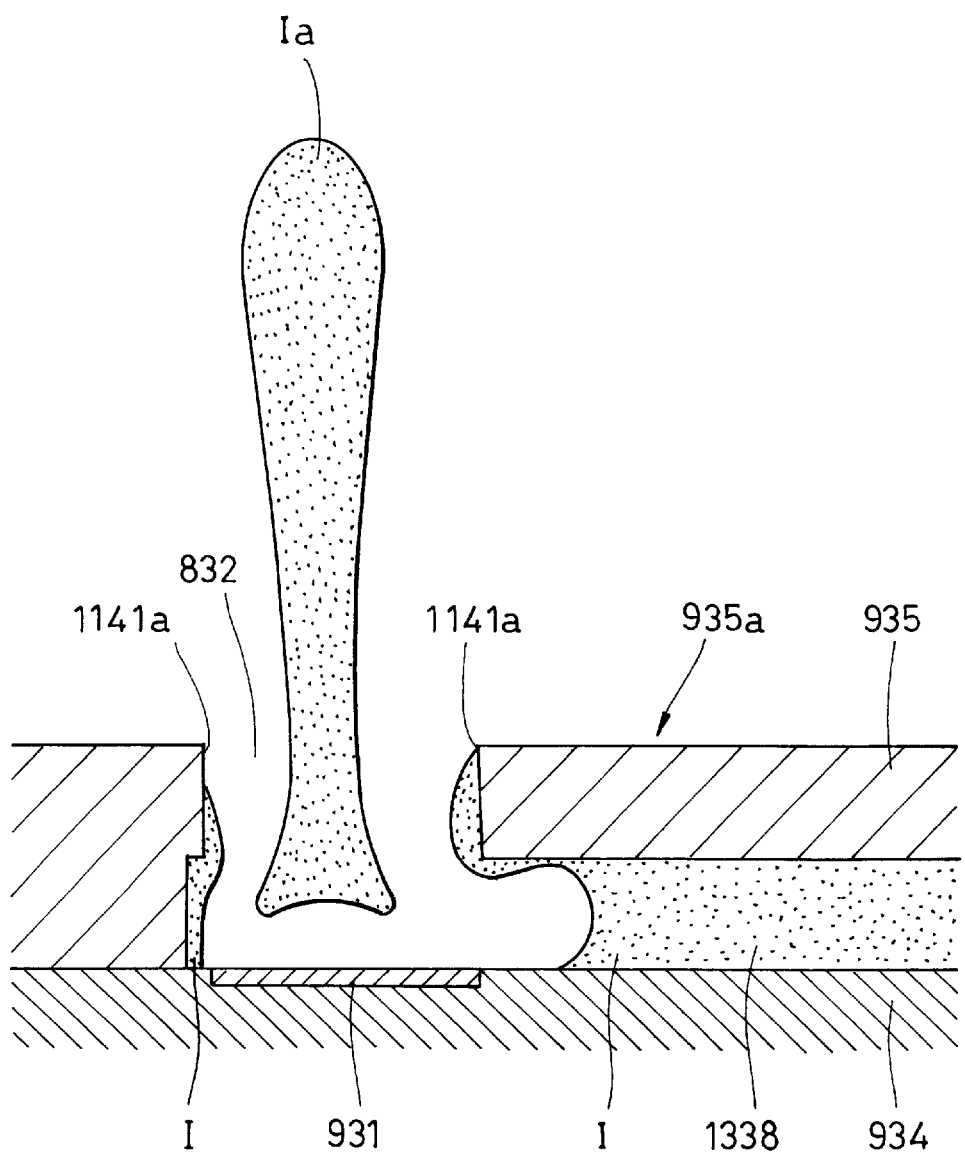
FIG. 19 is a schematic sectional view of the section indicated by arrows XV—XV shown in FIG. 14, for illustrating the actions of a liquid varying with time during the ejection of the liquid at a liquid ejection head, together with FIGS. 15 to 18, 20 to 22.
Figure 20:
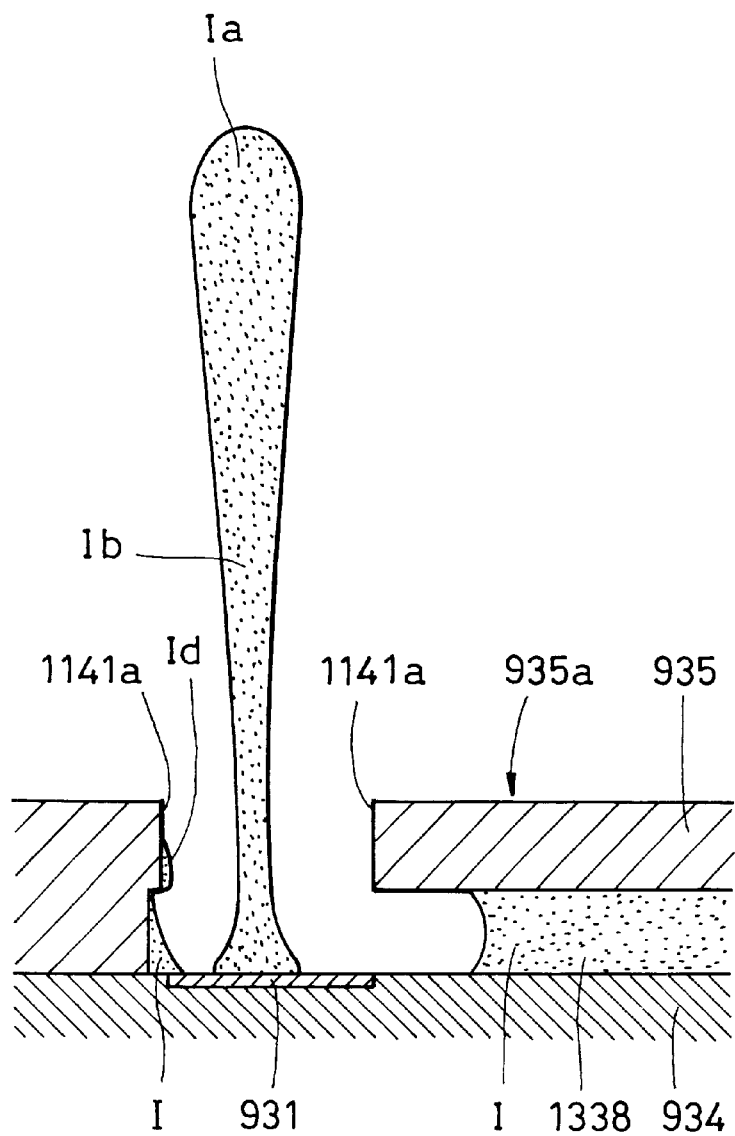
FIG. 20 is a schematic sectional view of the section indicated by arrows XV—XV shown in FIG. 14, for illustrating the actions of a liquid varying with time during the ejection of the liquid at a liquid ejection head, together with FIGS. 15 to 19, 21, and 22.
Figure 21:
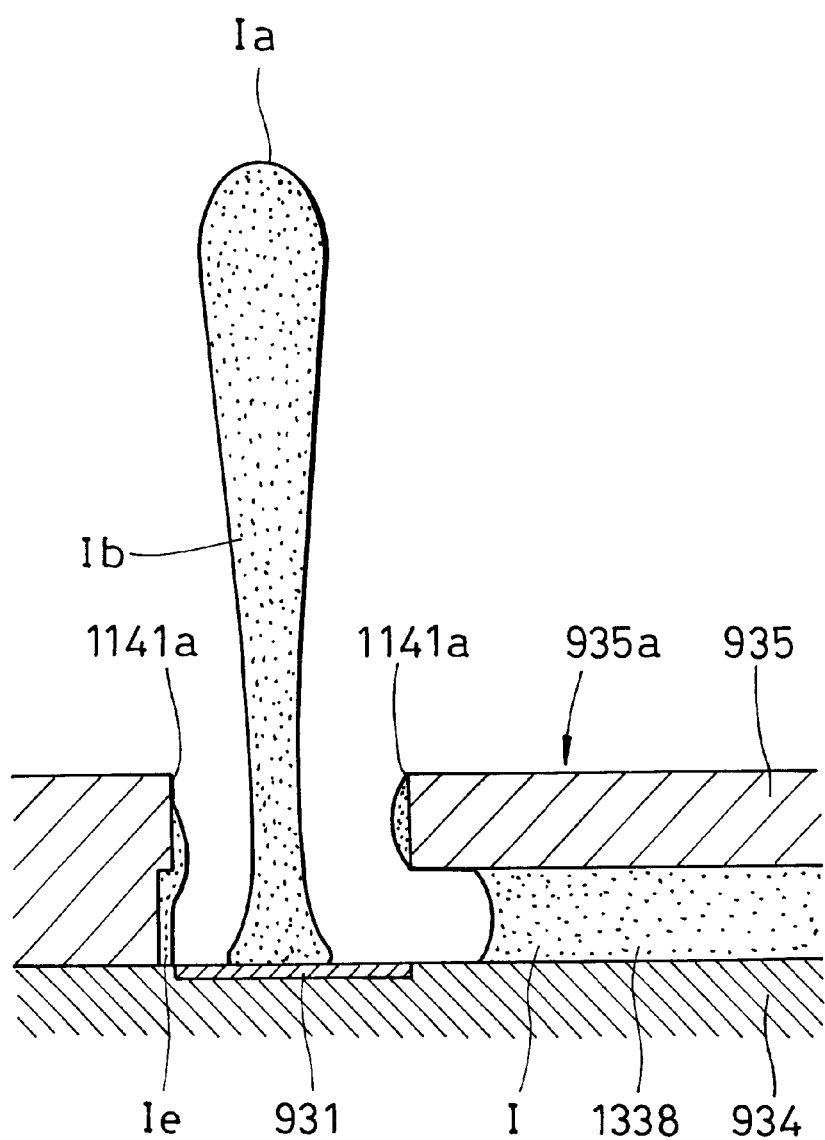
FIG. 21 is a schematic sectional view of the section indicated by arrows XV—XV shown in FIG. 14, for illustrating the actions of a liquid varying with time during the ejection of the liquid at a liquid ejection head, together with FIGS. 15 to 20, and 22.
Figure 22:
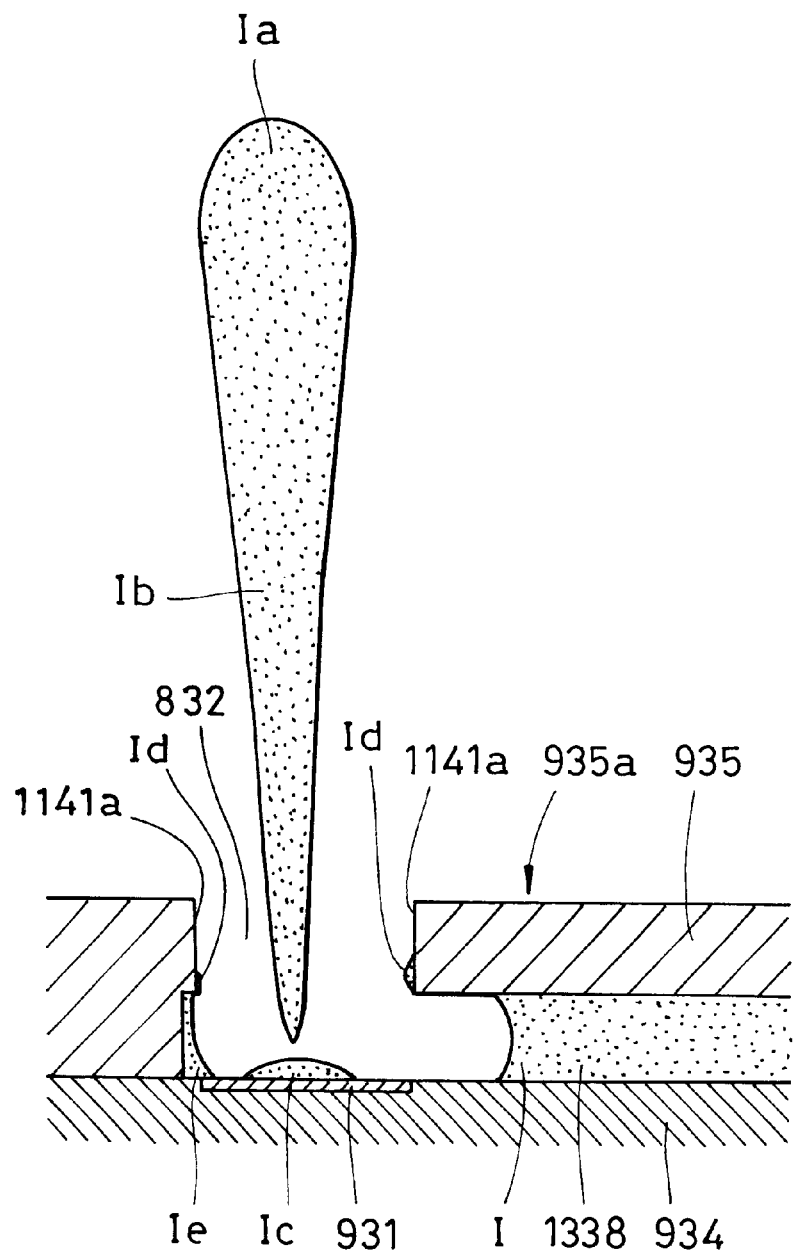
FIG. 22 is a schematic sectional view of the section indicated by arrows XV—XV shown in FIG. 14, for illustrating the actions of a liquid varying with time during the ejection of the liquid at a liquid ejection head, together with FIGS. 15 to 21.

Next, the liquid ejecting action of the ink-jet recording head having the aforementioned configuration will be explained with reference to FIG. 15 to FIG. 22. FIG. 15 to FIG. 22 are sectional views for illustrating the liquid ejecting action of the liquid ejection head as shown in FIG. 10 to FIG. 14, and are sectional views of the section XV—XV of the bubbling chamber 1337 shown in FIG. 14. In this section, the end in the direction of the thickness of the orifice plate of the ejection outlet 832 corresponds to the top part 1141a of a groove 1141. FIG. 15 shows the status in which a film-like bubble is generated on a heater. FIG. 16 shows the status about 1 μs after the status as shown in FIG. 15, FIG. 17 shows the status about 2 μs after the status as shown in FIG. 15, FIG. 18 shows the status about 3 μs after the status as shown in FIG. 15, FIG. 19 shows the status about 4 μs after the status as shown in FIG. 15, FIG. 20 shows the status about 5 μs after the status as shown in FIG. 15, FIG. 21 shows the status about 6 μs after the status as shown in FIG. 15, and FIG. 22 shows the status about 7 μs after the status as shown in FIG. 15. Herein, in the following explanations, fall, fall down, etc., do not mean a fall in the direction of gravity, but mean movement in the direction of the electrothermal transducer element in spite of the direction in which the head is mounted. In FIGS. 15 to 22, I designates ink.

As shown in FIG. 15, when a bubble 101 is generated in the liquid flow path 1338 on the heater 931 due to energization of the heater 931 based on the electric signal, etc., the bubble grows with a rapid increase in volume in about 2 μs, as shown in FIG. 16 and FIG. 17. The height of the bubble 101 at the maximum volume exceeds the level of the ejection outlet face 935a; at this time, the pressure of the bubble is decreased to about a half of atmospheric pressure to a twelfth or so of atmospheric pressure. The volume of the bubble 101 begins to decrease from the maximum volume about 2 μs after the generation of the bubble 101, and at nearly the same time, a meniscus 102 begins to be formed. As shown in FIG. 18, this meniscus 102 also retreats, that is, falls, toward the heater 931 side. Herein, in the present embodiment, since a plurality of grooves 1141 (shown in FIG. 12) are distributed in the ejection outlet part, during the retreat of the meniscus 102, the capillary force acts in the direction $F_c$ reverse to the direction $F_M$ of the retreat of the meniscus 102 in the grooves 1141. As a consequence, even if there is unevenness, to a certain degree, in the status of the bubble 101 for some reason, the shapes of the meniscus and the primary droplet (which hereafter may be described as liquid or ink) $I_a$ are corrected so as to be symmetrical with respect to the center of the ejection outlet during the retreat of the meniscus.

In the present embodiment, since the fall speed of the meniscus 102 is greater than the shrinkage speed of the bubble 101, as shown in FIG. 19, the bubble 101 communicates with the atmosphere in the neighborhood of the lower portion of the ejection outlet 832 at about 4 μs after the generation of the bubble. At this time, the liquid (ink) in the neighborhood of the center axis of the ejection outlet 832 falls down toward the heater 931. This is because the liquid (ink) $I_a$, which is brought back toward the heater 931 side by the negative pressure of the bubble 101 before communication with the atmosphere, keeps the speed in the direction of the heater 931 by inertia even after the bubble 101 communicates with the atmosphere. The liquid (ink) falling down toward the heater 931 side reaches the surface of the heater 931 at about 5 μs after the generation of the bubble 101 as shown in FIG. 20, and spreads over the surface of the heater 931 as shown in FIG. 21. The liquid spreading over the surface of the heater 931 has a vector in the horizontal direction along the surface of the heater 931, although since the vector in the direction intersecting the surface of the heater 931, for example, the vector in the vertical direction, disappears, the liquid tends to remain on the surface of the heater 931 so as to draw downward the above liquid which keeps the speed vector in the direction of the ejection. Thereafter, the liquid $I_b$ between the liquid spread over the surface of the heater 931 and the upper liquid (primary droplet) becomes thinner, and, as shown in FIG. 22, the liquid $I_b$ is cut at the center of the surface of the heater 931 at about 7 μs after the generation of the bubble 101, so as to be separated into the primary droplet $I_a$ keeping the speed vector in the direction of the ejection and the liquid $I_c$ spreading over the surface of the towards heater 931. The position of the separation is preferably inside of the liquid flow path 1338, and more preferably, is the heater 931 side rather than the ejection outlet 832 side. The primary droplet $I_a$ is ejected from the central portion of the ejection outlet 832 without bias in the direction of the ejection and without warp in the ejection, so as to hit the predetermined position on the recording face of the recording medium. The liquid $I_c$ spread over the surface of the heater 931, which was hitherto ejected as satellite droplets following the primary droplets, remains on the surface of the heater 931, and is not ejected. Therefore, since the satellite droplets can be prevented from being ejected, the spray, which is likely to be generated due to the ejection of the satellite droplets, can be prevented from being generated, so that the recording face of the recording medium can reliably be prevented from being soiled by this spray. In FIGS. 19 to 22, $I_d$ designates the ink adhering to the groove (ink in the groove), and $I_e$ designates the ink remaining in the liquid flow path.

As described above, in the liquid ejection head according to the present embodiment, when the liquid is ejected in the stage of the volume decrease after the bubble has grown to the maximum volume, the direction of the primary droplets during the ejection can be stabilized by a plurality of grooves distributed relative to the center of the ejection outlet. As a consequence, a liquid ejection head having no warp in the direction of the ejection and having superior hit precision can be provided. Since the ejection can be stably performed in spite of unevenness in the bubbling at high driving frequencies, a high-speed and high definition print can be realized.

In particular, since by ejecting the liquid while the bubble is communicated with the atmosphere, for the first time, in the stage of the volume decrease of the bubble, spray can be prevented from being generated during the liquid ejection while the bubble is communicated with the atmosphere, and the droplets can be prevented from adhering to the ejection outlet face, so that the factor of so-called sudden non-ejection can be eliminated.

As another embodiment of the recording head, which can be preferably used for the present invention and in which the bubble is communicated with the atmosphere at the ejection, for example, the so-called edge shooter type, as described in Japanese Patent No. 2,783,647, can be mentioned.

The present invention exhibits superior effects especially in the ink-jet recording heads and recording apparatuses in which recording is performed by forming ejection droplets using thermal energy, among ink-jet recording systems.

Regarding the typical configuration and principle thereof, it is preferable to use the basic principle disclosed in U.S. Pat. No. 4,723,129 and U.S. Pat. No. 4,740,796. This system can be applied to the so-called on-demand type and the continuous type. In particular, it is effective in the on-demand type because by applying at least one driving signal, which responds to recording information and imparts rapid temperature increase exceeding nucleate boiling, to the electrothermal transducer arranged in accordance with the sheet or liquid path where the liquid (ink) is held, the electrothermal transducer is made to generate thermal energy, and film boiling is generated on the heat-actuating surface of the recording head, and as a consequence, a bubble can be formed in the liquid (ink) in a one-to-one correspondence with the driving signal. The liquid (ink) is ejected through an opening for ejection due to growth and shrinkage of this bubble, so that at least one droplet is formed. When this driving signal has the shape of a pulse, since the growth and shrinkage of the bubble proceed promptly and appropriately, ejection of the liquid (ink), in particular, with superior responsiveness can be achieved. Therefore, this case is more preferable.

As this pulse shape signal, signals such as described in U.S. Pat. No. 4,463,359 and U.S. Pat. No. 4,345,262 are suitable. When conditions described in U.S. Pat. No. 4,313,124, which is an invention related to a temperature increase rate of the aforementioned heat-actuating surface, are adopted, further superior recording can be performed.

Regarding the configuration of the recording head, in addition to the configuration in which ejection outlets, liquid paths, and electrothermal transducers are combined as disclosed in the specifications of the aforementioned patents (linear liquid path or right-angled liquid path), configurations using U.S. Pat. No. 4,558,333 and U.S. Pat. No. 4,459,600 disclosing configurations in which heat-actuating portions are arranged in the bending regions, are also included in the present invention.

Furthermore, the present invention is also effective with the configurations based on Japanese Patent Laid-Open No. 59-123670 disclosing a configuration in which, regarding a plurality of electrothermal transducers, a common slit is made to be an ejection portion of the electrothermal transducers, and Japanese Patent Laid-Open No. 59-138461, disclosing the configuration in which an opening to absorb the pressure wave of thermal energy corresponds to an ejection portion.

Regarding a full-line type recording head having a length corresponding to the maximum width of a recording medium on which the recording apparatus can record, the configuration in which a plurality of recording head are combined in order to satisfy the length and the configuration in which one recording head is integrally formed, as disclosed in the aforementioned specifications, may be adopted, and the present invention can further effectively exhibit the aforementioned effects.

When a freely exchangeable chip type recording head which can be electrically connected with an apparatus main body and can be supplied with ink from the apparatus main body by being incorporated in the apparatus main body, or a cartridge type recording head in which an ink tank is integrally provided on the recording head itself is used, the present invention is also effective.

It is preferable to add a recovery device, a reserve and an auxiliary device, etc., to the recording head as the configuration of the recording apparatus according to the present invention, because the effects of the present invention can be further stably exhibited. Specifically, a capping device, a cleaning device, a pressure or suction device, a reserve heating device which is an electrothermal transducer, other heater element, or a combination thereof, are mentioned. It is effective for stable recording to have a reserve ejection mode which performs an ejection other than recording.

The present invention is very effective for a recording apparatus having not only a single-color recording mode of primary color, for example, black color, but also recording modes of one of multicolor of different colors and full-color using color mixing which may be achieved by the integral configuration of the recording head or by combination of a plurality of recording heads.

In the explanation of the present embodiment as described above, it is assumed that the ink is liquid. In general, the ink solidifies at room temperature or lower, and furthermore, the ink softens, or is liquid, at room temperature, or in the aforementioned ink-jet system, the temperature of the ink itself is controlled to be within the range of 30° C. or more, but 70° C. or less, in order to control the viscosity of the ink to be within the range of stable ejection. Therefore, it is essential that the ink be in a liquid state when the recording signal for use is applied.

In addition, temperature increase due to thermal energy may be actively prevented by using the thermal energy as the energy for causing a change of state of the ink from the solid state to the liquid state, or in order to prevent evaporation of the ink, an ink which solidifies during standing may be used. The use of inks, that liquefy only after applying the thermal energy, for example, ink that is liquefied by application of thermal energy in response to the recording signal and is ejected, and the ink that begins to solidify before the time the ink reaches the recording medium, also can be applied to the present invention. In the aforementioned cases, the ink may be held in the concave portion of the surface of the porous sheet or in the penetrated hole of the porous sheet as a liquid or solid material facing the electrothermal transducer, as described in Japanese Patent Laid-Open No. 54-56847 and Japanese Patent Laid-Open No. 60-71260. In the present invention, regarding the aforementioned inks, it is most effective to practice the aforementioned film boiling system.

Furthermore, the recording apparatus according to the present invention may be in the form of an integrally or separately provided image output terminal of a word processor, computer, etc., and in addition to this, may be in the form of a copying apparatus in combination with a reader and a facsimile apparatus having a transmit-receive function.

Next, a liquid ejection apparatus having the aforementioned liquid ejection head mounted on it will be briefly explained.

Figure 23:
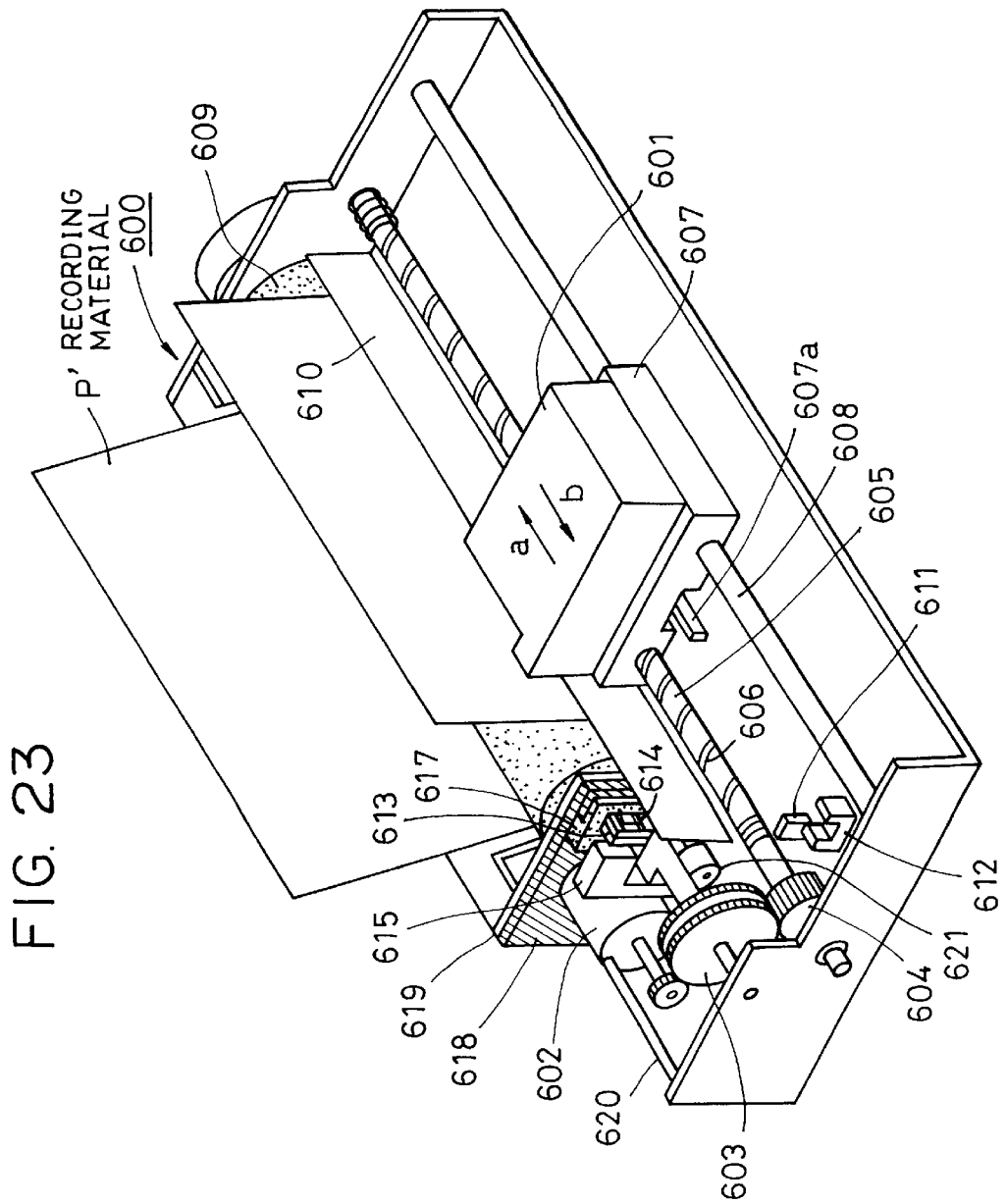
FIG. 23 is a diagram of a configuration of an ink-jet recording apparatus to which the present invention can be applied.

FIG. 23 is a schematic perspective view of an ink-jet recording apparatus 600 that is an embodiment of a liquid ejection apparatus which can have a liquid ejection head according to the present invention mounted on it. In FIG. 23, an ink-jet head cartridge 601 is composed of the aforementioned liquid ejection head and an ink tank storing ink to be supplied to this liquid ejection head, which are integrated. This ink-jet head cartridge 601 is mounted on a carriage 607 engaging a helical groove 606 of a lead screw 605 which rotates in accordance with the rotation in the forward and reverse directions of a drive motor 602 with driving force transmission gears 603 and 604 therebetween, and is reciprocated along a guide 608 in the directions of a and b indicated by arrows together with the carriage 607 by the power of the drive motor 602. A recording material P' is conveyed on a platen roller 609 by a recording material conveying device, although not shown in the drawing, and is pressed by a paper holding board 610 against the platen roller 609 over the direction of the movement of the carriage 607.

At the neighborhood of one end of the lead screw 605, photocouplers 611 and 612 are deployed. These are home position detection devices in order to detect the presence of a lever 607a of the carriage 607 in this region and to perform change of the direction of rotation of the drive motor 602, etc.

A support member 613 is to support a cap member 614 which covers the front face having an ejection outlet (ejection outlet face) of the aforementioned ink-jet head cartridge 601. An ink suction device 615 suctions ink accumulated in the cap member 614 due to ejection, etc., from the ink-jet head cartridge 601.

By this ink suction device 615, suction recovery of the ink-jet head cartridge 601 is performed through the opening portion in the cap, although not shown in the drawing. A cleaning blade 617 to wipe the ejection outlet face of the ink-jet head cartridge 601 is provided so as to be movable by a movement member 618 in the forward and backward directions (the directions orthogonal to the direction of the movement of the aforementioned carriage 607). The cleaning blade 617 and the movement member 618 are supported by a main body support 619. The cleaning blade 617 is not limited to this form, and may be other common cleaning blades.

In the suction recovery operation of the liquid ejection head, a lever 620 for starting the suction moves in accordance with the movement of a cam 621 engaging the carriage 607, and the driving force from the drive motor 602 is transmitted and controlled using publicly known transmission devices such as a clutch for changing, etc. An ink-jet recording control portion, which applies signals to a heater provided in the liquid ejection head of the ink-jet head cartridge 601, and governs driving controls of each of the aforementioned mechanisms, is provided in the main body side of the apparatus, so that it is not shown in the drawing.

In the ink-jet recording apparatus 600 having the aforementioned configuration, the ink-jet head cartridge 601 performs recording on the recording material P' being conveyed on the platen roller 609 by the recording material conveying device, although not shown in the drawing, while the ink-jet head cartridge 601 is reciprocating over the full width of the recording material P'. The ink-jet recording apparatus used in the present invention is not limited to this, and other ink-jet recording apparatuses can also be used.

EXAMPLES

The present invention will be specifically explained below using Examples and Comparative Examples. In the following description, parts and % are on a weight basis, unless otherwise specified.

<Preparation of Dispersion 1>

1.69 g of silver nitrate was added into a solution of 30 g of water and 3.08 g of $H_3N^+C_6H_4(CH_3)_3Cl^-.I^-$ while agitating. Generated precipitates were removed by filtration, and the filtrate was added into a suspension, in which 10 g of carbon black having a specific surface area of 230 m$^2$/g and DBPA of 70 mL/100 g was dispersed in 70 g of water, while agitating. Then, 2.25 g of concentrated nitric acid is added, and thereafter, a solution of 10 g of water and 0.83 g of sodium nitrite was added. Consequently, diazonium salt including $NN^+C_6H_4N^+(CH_3)_3$ group having the following structure was reacted with carbon black and nitrogen gas was generated. When the generation of bubbles of nitrogen gas stopped, the resulting disperse liquid was dried in an oven at 120°. As a result, a product in which $C_6H_4N^+(CH_3)_3$ group was bound to the surface of the carbon black was produced.

The resulting carbon black powder was dispersed in water again, so as to produce a dispersion of self-dispersing carbon black having a pigment content of 15%.

Then, counter ions of the resulting carbon black were converted to conjugate bases of acetic acid with an ion-exchange resin, and Dispersion 1 was prepared.

<Preparation of Dispersion 2>

Counter ions of the carbon black produced as described above were converted to conjugate bases of benzoic acid with an ion-exchange resin, and Dispersion 2 was prepared.

<Preparation of Dispersion 3>

A solution of 2.12 g of 4-acetaminophenacyl chloride, 0.83 g of pyridine, and 6.4 g of dimethyl sulfoxide was agitated for one night. 0.8 g of pyridine and 1 g of dimethyl sulfoxide were further added, and thereafter, the resulting solution was further agitated for 5 hours. 50 mL of ether was added, and acetamidophenacylpyridinium chloride was separated by filtration. The separated acetamidophenacylpyridinium chloride was dissolved into water, and the resulting solution was filtered, and thereafter, 1.7 g of concentrated nitric acid was added. The resulting solution was boiled for one hour, and after cooling, acetone was added. Then, 4-aminophenacylpyridinium chloride hydrochloride was produced by filtration. 2 g of the resulting 4-aminophenacylpyridinium chloride hydrochloride was dissolved into 15 g of water, and 4.5 g of basic ion-exchange resin (Amberlite IRA400-OH) was added. After agitation, the ion-exchange resin was removed by filtration so as to produce an aqueous solution of 4-aminophenacylpyridinium chloride. An aqueous solution of 25 g of water and 1.3 g of 4-aminophenacylpyridinium chloride was refluxed with 1 g of silver nitrate for 90 minutes. Generated precipitates were removed by filtration. Then, 5 g of carbon black having a specific surface area of 200 m$^2$/g and DBPA of 122 mL/100 g was added, and the resulting mixture was heated to about 80° C. 0.52 g of concentrated hydrochloric acid was added, and thereafter, a solution of small amounts of water and sodium nitrite was added. Furthermore, the disperse liquid was agitated for 1.5 hours. As a consequence, a diazonium salt including NN$^+$C$_6$H$_4$COCH$_2$(N$^+$C$_5$H$_5$) group having the following structure was produced and was reacted with carbon black. As a result, a product in which C$_6$H$_4$COCH$_2$(N$^+$C$_5$H$_5$) group was bound to the surface of the carbon black was produced. The resulting carbon black powder was dispersed in water again, so as to produce a self-dispersing carbon black disperse material having a pigment content of 15%.

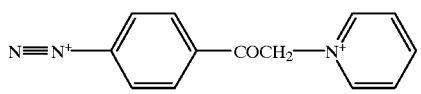

Then, counter ions of the resulting carbon black were converted to conjugate bases of acetic acid with an ion-exchange resin, and Dispersion 3 was prepared.

EXAMPLES

Each of the aforementioned Carbon Black Disperse Materials 1 to 3 was blended with the following components.

Each of the resulting mixtures was sufficiently agitated and dissolved, and thereafter, was pressure-filtered using a microfilter having a pore size of 3.0 μm (manufactured by Fuji Photo Film Co., Ltd.) so as to produce Bk Inks 1 to 3, respectively.

| | |
|---|---|
| Glycerin | 5 parts |
| Diethylene glycol | 5 parts |
| Triethylene glycol | 7 parts |
| The aforementioned Dispersion 1, 2, or 3 | 5 parts (solid content) |
| Ethylene oxide adduct of acetylene glycol (Acetylenol EH (manufactured by Kawaken Fine Chemicals Co., Ltd.)) | 0.2 parts |
| Water | rest (total 100 parts) |

Acidic compounds were added to Bk Inks 1 to 3 prepared as described above and the total of each of the inks was controlled to be 100 parts, so as to prepare Bk Inks of Examples 1 to 5 as described below.

Example 1

0.168 parts of acetic acid was added to Bk Ink 1, and the total was made to be 100 parts.

Example 2

0.025 parts of sulfuric acid was added to Bk Ink 1, and the total was made to be 100 parts.

Example 3

0.1 parts of glycolic acid was added to Bk Ink 2, and the total was made to be 100 parts.

Example 4

0.1 parts of glycolic acid was added to Bk Ink 3, and the total was made to be 100 parts.

Example 5

0.264 parts of acetic acid was added to Bk Ink 3, and the total was made to be 100 parts.

As Comparative Examples

Bk Inks 1 to 3 without addition of the acidic compound were used.

Comparative Example 1

Bk Ink 1.

Comparative Example 2

Bk Ink 2.

Comparative Example 3

Bk Ink 3.

Regarding Examples 1 to 5 and Comparative Examples 1 to 3, the acid of the counter ion of the carbon black and the pKa thereof, the additional acidic compound and the pKa of the dissociation stage thereof with a dissociation constant of less than 1, and the concentration thereof in the ink, and the pH of the ink are shown in Table 1.

TABLE 1

| | Counter Ion | | Additional Acidic Compound | | | | pH of Ink |
|---|---|---|---|---|---|---|---|
| | Kind | pKa of Acid | Kind | pKa of Acid | Concentration (mol/L) | Addition Quantity (%) | |
| Example 1 | Acetic acid | 4.73 | Acetic acid | 4.73 | 0.028 | 0.168 | 4.0 |
| Example 2 | Acetic acid | 4.73 | Sulfuric acid | 1.99 | 0.0026 | 0.025 | 4.5 |
| Example 3 | Benzoic Acid | 4.19 | Glycolic acid | 3.82 | 0.013 | 0.1 | 3.5 |
| Example 4 | Acetic acid | 4.73 | Glycolic acid | 3.82 | 0.013 | 0.1 | 3.8 |
| Example 5 | Acetic acid | 4.73 | Acetic acid | 4.73 | 0.044 | 0.264 | 3.6 |
| Comparative Example 1 | Acetic acid | 4.73 | — | — | — | — | 5.2 |
| Comparative Example 2 | Benzoic Acid | 4.19 | — | — | — | — | 4.0 |
| Comparative Example 3 | Acetic acid | 4.73 | — | — | — | — | 4.7 |

Evaluation

Inks of Examples 1 to 5 and Comparative Examples 1 to 3 were evaluated with BJF800 (manufactured by CANON KABUSHIKI KAISHA). Regarding the evaluation method, continuous ejection was performed, and subsequently, ejection was suspended for a specified period, and thereafter, ejection was performed again. Then, maximum suspension period, which refers to that even after the period of suspension, stable ejection can be achieved, was measured, and evaluation was performed based on the following criteria. Herein, when the evaluation was A or B, that ink was judged to be ink which could achieve the objects of the present invention. Stable ejection referred to that there was no irregularity among printed dots and the sizes of the dots were uniform.

A ejection was stable after a suspension period exceeding 10 seconds (the maximum suspension period exceeds 10 seconds).
B ejection was stable after a suspension period of 7 to 9 seconds (the maximum suspension period is 7 to 9 seconds).
C ejection was stable after a suspension period of 4 to 6 seconds (the maximum suspension period is 4 to 6 seconds).
D ejection was stable only after a suspension period of 3 seconds or less (the maximum suspension period is not more than 3 seconds).

Results

The results of the evaluation are as shown in Table 2.

TABLE 2

| Ink | Evaluation |
|---|---|
| Example 1 | B |
| Example 2 | B |
| Example 3 | B |
| Example 4 | A |
| Example 5 | B |
| Comparative Example 1 | D |
| Comparative Example 2 | D |
| Comparative Example 3 | C |

Evaluations were also performed regarding the character quality and the image density, with the result that the inks of the Examples bore comparison with the inks of the Comparative Examples.

Regarding bleeding between the black ink of each of the aforementioned Examples and a color ink including an anionic dye, an image pattern in which color and black image regions are adjacent to each other was printed, and bleeding at the boundary thereof was visually evaluated. As a result, bleeding at the boundary was barely observed, and the effect of alleviation of bleeding was excellent.

As described above, the present invention provides an aqueous ink, that exhibits characteristics based on the cationic self-dispersing carbon black, that is, for example, when used in an ink-jet recording apparatus, an image formed with the ink has high character quality and high image density, and furthermore, bleeding between anionic color ink and the aqueous ink is alleviated, and the ink has superior ejection stability even after temporary suspension of printing.

By using the aforementioned ink, an ink-jet recording method, which can stably produce high quality prints, is provided.

Furthermore, an ink-jet recording apparatus, a recording unit, and an ink cartridge, which can stably form high quality prints, also is provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An aqueous ink comprising:
   a cationic self-dispersing pigment, in which at least one cationic group is bound to the surface of the pigment directly or with another atomic group therebetween;
   a water-soluble organic solvent; and
   water,
   wherein the aqueous ink further comprises an acidic compound including a proton in the structure thereof that can be dissociated due to dissolution into water, said compound having a dissociation stage of the proton with a dissociation constant of less than 1; and
   wherein the self-dispersing pigment has an anion as a counter ion for the cationic group, the anion being a conjugate base of a weak acid, and the difference between pKa of the dissociation stage of the acidic compound and pKa of a conjugate acid of the anion is 5 or less.

2. An aqueous ink comprising:
   cationic self-dispersing carbon black, in which at least one cationic group is bound to the surface of the carbon black directly or with another atomic group therebetween;
   a water-soluble organic solvent; and
   water,
   wherein the aqueous ink further comprises an acidic compound including a proton in the structure thereof that can be dissociated due to dissolution into water, said compound having a dissociation stage of the proton with a dissociation constant of less than 1; and wherein the self-dispersing carbon black has an anion as a counter ion for the cationic group, the anion being a conjugate base of a weak acid, and the difference between pKa of the dissociation stage of the acidic compound and pKa of a conjugate acid of the anion is 5 or less.

3. The aqueous ink according to claim 2, wherein the other atomic group is a straight chain or branched chain alkylene group having 1 to 12 carbons, a substituted or unsubstituted phenylene group, or a substituted or unsubstituted naphthylene group.

4. The aqueous ink according to claim 2, wherein the cationic group is at least one selected from the group consisting of groups represented by the following formulae:

—N$^+$H$_3$
—N$^+$H$_3$

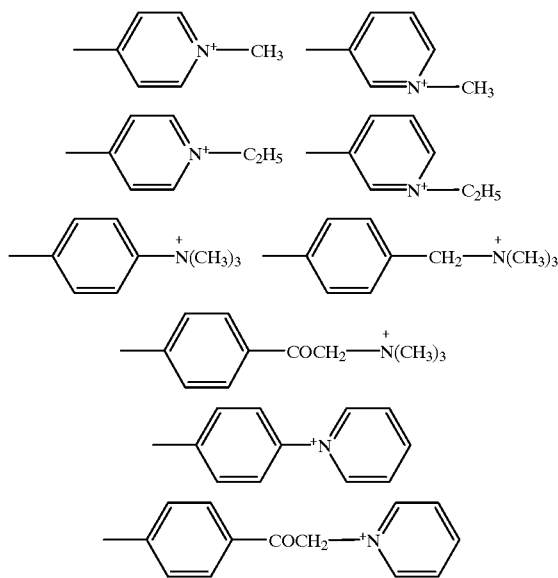

wherein R represents an alkyl group having 1 to 12 carbons, a substituted or unsubstituted phenyl group, or a substituted or unsubstituted naphthyl group.

5. The aqueous ink according to claim 2, wherein the ink has a pH of 6 or less.

6. The aqueous ink according to claim 2, wherein the acidic compound is contained in an amount of 0.1 mol/L or less in the ink.

7. The aqueous ink according to claim 6, wherein the acidic compound is contained in an amount of 0.05 mol/L or less in the ink.

8. The aqueous ink according to any one of claims 2, 3, 4, or 5 to 7, wherein the aqueous ink is used for ink-jet recording.

9. An ink-jet recording method comprising a step of performing recording on a recording material by ejecting an ink from an orifice in response to a recording signal, wherein the ink is the aqueous ink according to claim 8.

10. The ink-jet recording method according to claim 9, wherein the ink is ejected by application of thermal energy to the ink.

11. A recording unit comprising:
    an ink container containing the ink according to claim 8; and
    a head for ejecting the ink.

12. The recording unit according to claim 11, wherein the head comprises a head that ejects the ink by applying thermal energy to the ink.

13. An ink cartridge comprising an ink container containing the ink according to claim 2.

14. An ink-jet recording apparatus comprising a recording unit comprising:
    an ink container containing an ink according to claim 8; and
    a head for ejecting the ink.

15. The ink-jet recording apparatus according to claim 14, wherein the head comprises a head that ejects the ink by applying thermal energy to the ink.

16. An ink-jet recording apparatus comprising:
    an ink cartridge comprising an ink container containing the ink according to claim 8; and
    a recording head for ejecting the ink.

17. The ink-jet recording apparatus according to claim 16, wherein the recording head is a head that ejects the ink by applying thermal energy to the ink.

18. An ink set comprising:
    a first aqueous ink; and
    a second aqueous ink,
    wherein the first aqueous ink comprises:
        cationic self-dispersing carbon black, in which at least one cationic group is bound to the surface of the carbon black directly or with another atomic group therebetween;
        a water-soluble organic solvent; and
        water,
    wherein the first aqueous ink further comprises an acidic compound including a proton in the structure thereof that can be dissociated due to dissolution into water, said compound having a dissociation stage of the proton with a dissociation constant of less than 1; and
    wherein the self-dispersing carbon black has an anion as a counter ion for the cationic group, the anion being a conjugate base of a weak acid, and the difference between pKa of the dissociation stage of the acidic compound and pKa of a conjugate acid of the anion is 5 or less.

19. The ink set according to claim 18, wherein the second aqueous ink comprises an anionic coloring material.

20. The ink set according to claim 19, wherein the anionic coloring material comprises an anionic self-dispersing pigment and an anionic dispersing agent for the pigment.

21. The ink set according to claim 19, wherein the anionic coloring material comprises an anionic dye.

22. The ink set according to claim 18, wherein the first and second aqueous inks are for ink-jet recording.

* * * * *

UNITED STATES PATENT AND TRADEMARK OFFICE
CERTIFICATE OF CORRECTION

PATENT NO. : 6,706,105 B2
DATED : March 16, 2004
INVENTOR(S) : Yuko Takada et al.

It is certified that error appears in the above-identified patent and that said Letters Patent is hereby corrected as shown below:

Column 1,
Lines 9 and 10, "a acqueous" should read -- an acqueous --.

Column 3,
Line 40, "signal is provided," should read -- signal, --.

Column 9,
Line 67, "c-caprolactam," should read -- ϵ-caprolactam, --.

Column 10,
Line 29, "a acqueous" should read -- an acqueous --.

Column 11,
Line 7, "it etc.," should read -- etc., --.

Column 18,
Line 40, "head" should read -- heads --.

Column 25,
Lines 16-17, "—$N^+H_3$" should read -- —$N^+R_3$ --.
Line 53, "claims 2,3," should read -- claims 2 to 7, --.
Line 54, "4, or 5 to 7," should be deleted.

Signed and Sealed this

Twentieth Day of July, 2004

JON W. DUDAS
*Acting Director of the United States Patent and Trademark Office*